(12) United States Patent
Graves et al.

(10) Patent No.: US 7,050,667 B2
(45) Date of Patent: May 23, 2006

(54) METROPOLITAN PHOTONIC SWITCH

(75) Inventors: Alan F. Graves, Kanata (CA); George S. Irwin, Kanata (CA); John H. Watkins, Ottawa (CA)

(73) Assignee: Nortel Networks Limited, Montreal (CA)

( * ) Notice: Subject to any disclaimer, the term of this patent is extended or adjusted under 35 U.S.C. 154(b) by 89 days.

(21) Appl. No.: 10/768,050

(22) Filed: Feb. 2, 2004

(65) Prior Publication Data

US 2004/0184714 A1 Sep. 23, 2004

Related U.S. Application Data

(62) Division of application No. 09/893,498, filed on Jun. 29, 2001, now Pat. No. 6,690,848.

(51) Int. Cl.
*G02B 6/26* (2006.01)

(52) U.S. Cl. .............................. 385/16; 385/17; 385/27

(58) Field of Classification Search .................. 385/16, 385/17, 27, 31; 398/49, 79
See application file for complete search history.

(56) References Cited

U.S. PATENT DOCUMENTS

| | | | | |
|---|---|---|---|---|
| 6,272,154 B1 * | 8/2001 | Bala et al. | .................. | 370/535 |
| 6,400,478 B1 * | 6/2002 | Cheng et al. | .................. | 398/79 |
| 6,404,940 B1 * | 6/2002 | Tsuyama et al. | ............... | 385/17 |
| 6,459,516 B1 * | 10/2002 | Mizrahi et al. | ................ | 398/82 |
| 6,519,060 B1 * | 2/2003 | Liu | .............................. | 398/49 |
| 2001/0026384 A1 * | 10/2001 | Sakano et al. | ............... | 359/124 |

* cited by examiner

*Primary Examiner*—Kaveh Kianni

(57) ABSTRACT

A photonic switch uses a cost-effective DWDM optimized switch architecture allowing the introduction of DWDM into the metro network. In order to implement this architecture cost-effective ways of implementing the optical carrier frequency/wavelength precision required for a Dense Wavelength Division Multiplexing 100 GHz or 50 GHz on-grid solutions are needed. The photonic switch acts as an intermediary between the WDM density of the access portion of the metropolitan photonic network and the DWDM density of the core photonic network. The metro photonic switch introduces optical carriers that are all generated in the photonic layer adjacent to it and allocates them out to the photonic access nodes for modulation. This has the advantage of providing the optical carriers to be modulated from a centralized highly stable and precise source, thereby meeting the requirements for DWDM carrier precision, whilst generating these carriers in relatively close proximity to the modulators. Coarse WDM components can be used in the access portion of the network without adversely affecting the ability of the signal to transit the DWDM portion of the core network, since the optical carrier frequency is fixed at the centralized source and is unaffected by these components.

19 Claims, 19 Drawing Sheets

METROPOLITAN PHOTONIC SWITCH

This application is a Divisional of non-provisional U.S. patent application Ser. No. 09/893,498 filed on Jun. 29, 2001 now U.S. Pat. No. 6,690,848.

FIELD OF THE INVENTION

The present invention relates to photonic switches and is particularly concerned with metropolitan area networks.

BACKGROUND OF THE INVENTION

A Dense Wavelength Division Multiplexed photonic network requires precisely controlled (in optical carrier frequency) modulated optical carriers from the customer premises for a DWDM core photonic network to be viable. In prior art solutions, all optical carriers are locally generated at the access point. If fixed optical carrier frequency lasers are used, network engineering of distribution of laser wavelengths must be mapped out on a network wide basis. Alternatively, individual tunable lasers can be used at all access points, providing greater flexibility in network engineering at a significant increase in hardware costs, and a need to introduce remote optical frequency provisioning.

SUMMARY OF THE INVENTION

According to an aspect of the present invention a photonic switch couples network access equipment with the DWDM core network for transmission across that network.

BRIEF DESCRIPTION OF THE DRAWINGS

These and other features of the invention will become more apparent from the following description in which reference is made to the appended drawings in which:

FIG. 9a graphically illustrates a wavelength plan for the network of FIGS. 1–3, which in this example is standard DWDM "C" band;

FIG. 9b graphically illustrates gain response as a function of wavelength for exemplary erbium-doped waveguide amplifiers for implementing the wavelength plan of FIG. 9a;

FIG. 11 illustrates a metropolitan photonic network switch configured for implementing the wavelength plan of FIG. 9a;

DETAILED DESCRIPTION OF THE PREFERRED EMBODIMENT

Figure 1:
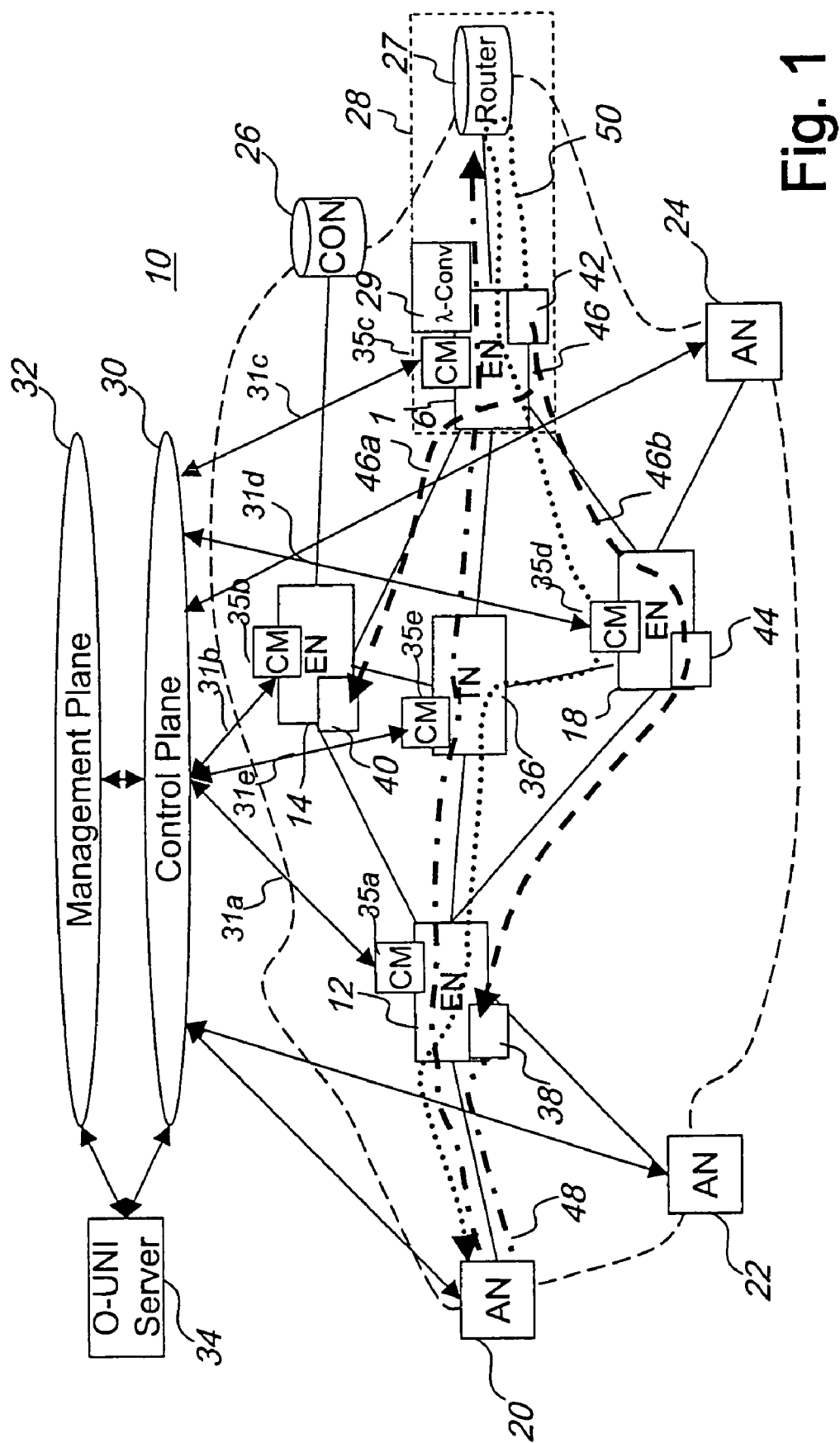
FIG. 1 illustrates in a block diagram a photonic network capable of using an embodiment of the present invention.

Referring to FIG. 1, there is illustrated in a block diagram a photonic network capable of using an embodiment of the present invention. The metropolitan photonic network 10 includes a plurality of network nodes in the form of metropolitan photonic nodes 12, 14, 16, 17, and 18 providing edge node, tandem node or mixed edge/tandem node functionality which are interconnected to form an optical mesh network. The edge nodes are connected to access nodes that terminate the optical network, for example photonic edge nodes (EN) 12 and 18 are coupled to access nodes (AN) 20 and 22, and 24 respectively, while edge nodes 14 and 16 are coupled to content switch 26 and MPLS router 27, respectively. The photonic edge node 16 and the router 27 are closely coupled to form a core node 28 and include a lambda converter 29. All network nodes are coupled to a network control plane 30 via links 31, which is itself coupled to a management plane 32. By way of example an Optical UNI server 34 is shown coupled to the management and control planes 30 and 32. These planes also interface with other applicable protocol servers as appropriate for the network configuration (e.g. Internet Protocol, Ethernet). All nodes in the core network include a contact manager (CM) 35 coupled to the control plane 30. The control plane 30 is implemented as a 100 bT Ethernet network using 1310 nm and coarse-WDM (true band-level coarse WDM) on inter-switch node fibers. Each switch node is associated with a small Ethernet hub/switch (not shown in FIG. 1) for passing through Ethernet packet info and extracting local communications to/from local node controller and Contract Manager. Each edge node 12, 14, 16, and 18 includes a multi-lambda carrier source 38, 40, 42, and 44, respectively.

In operation, network 10, when implementing an embodiment of the present invention, provides network end-to-end transport based upon the allocation of optical carriers of specific wavelengths and implement the distribution of the appropriate optical carriers to achieve the required end-to-end wavelength path connection across the network. Access node #X (or router #Y) requests a cross-network path by sending a request to the photonic network control plane, specifically the O-UNI, via links 31. The control-plane passes the requests to the O-UNI server, which establishes the validity of the request and the locations of the optical path end points for the optical path to be set up or taken down, as well as any GoS, QoS constraints. The O-UNI, via the control plane, notifies the Contract Managers (CM's) at the individual edge nodes and tandem nodes either the required end-to-end path and lets them collaborate to find one (the optical network controller (ONC), Contract Manager model as described in co-pending U.S. application Ser. No. 09/453,282 entitled "Architectures for Communications Networks", filed on Dec. 3, 1999 assigned to the Assignee of the present invention.) or the management/control plane determines an available end-to-end path, including cross-connections in the edge nodes and lambdas to use, and notifies the affected nodes. The edge nodes then set up the correct connections and the adjacent lambda source feeds the correct lambda to the access node #X. The access does not need to know what wavelength it is using, since this is managed within the network to ensure appropriate photonic connectivity. Once complete the access node is notified that its lambda-path is in place. For the access nodes, links 31f, 31g, and 31h service (lambda) requests to O-UNI and returns notification of grants of lambda requests. For the photonic nodes, links 31a–31e handle end-to-end bandwidth requests (lambda) from O-UNI 34 to CM 35. Inter-CM communications are used to establish the components of the end-to-end path. Upon path establishment, confirmation of path is sent to O-UNI 34 from CM35.

The optical carrier to be modulated is provided as a clean unmodulated optical carrier from a local source, co-located with the edge node, along with the downstream data on a separate optical carrier of a different optical frequency which originates at the far end of the network path. There may be some co-ordination between the optical carriers to simplify the provisioning process, e.g. odd lambda downstream data-stream is associated with the next highest lambda for the upstream data (and hence downstream optical unmodulated carrier) or even lambda downstream gets next lower odd lambda upstream, which allows all lambdas to be used. In addition the multi-lambda carrier sources associated with each switch node can be synchronized to a master optical carrier, generated in one of the Multi-lambda sources (MLS). This is described in more detail, especially with respect to the implementation of the MLS, MLS synchronization technique in co-pending application filed Jun. 1, 2001, Ser. No. 60/294,919; hereinafter referred to as (MLS synch). For example, for the purpose of synchronization, a designated master multi-lambda carrier source 42, associated with EN16, generates a reference lambda carrier 46, which is sent to all remaining multi-lambda carrier sources in the network, 46a going to the multi-lambda carrier source 40 and 46b going to multi-lambda carrier sources 44 and 38. These multi-lambda carrier sources then generate their multi-lambda carriers with reference to carrier 46. For example, the multi-lambda carrier source 38 of edge node 12 generates a carrier 48 which is output to AN20, where it is modulated and returned to the network via 12, 36, 16 until it terminates on router 28. Meanwhile the multi-lambda carrier source 42 of edge node 16 generates a carrier 50 which it outputs to router 28, which modulates it, returns it to the network via 16, 44, 36, 12 to terminate on 20, thereby completing the bi-directional path.

The detailed structure of the switch edge-facing or access-facing port card depends upon the actual wavelength allocation methodology, and the required network and hence node functionality, but all approaches use the method of providing the originating optical carrier at a specific wavelength as laid out herein. The control plane 30 and management plane 32 both couple across to the Ethernet control, management planes as well as to the Optical UNI server 34 (Optical User-Network Interface Server). The photonic network 10 is quasi-autonomous, and configures its wavelength paths based upon requests for end-to-end connectivity passed to the O-UNI Server. This server then notifies each node of the required new end-to-end path and the nodes co-operate to establish such a path. Methods to do this were disclosed in co-pending U.S. application Ser. No. 09/453, 282 entitled "Architectures for Communications Networks", filed Dec. 3, 1999, referred to herein after as (Graves Hobbs 1999). Such operation permits simplification in layer 2, 3 (L2, L3) network topology by permitting reconfigurable bypass and cost effective access to centralized network L2 and L3 resource. An end-to-end lambda provisioned photonic network greatly reduces component count seen in opto-electronic hybrid networks. For example in traversing the network of FIG. 1 from access node 20 to access node 24 (or any other nodes e.g. 20, 28, 26, 44 to 24), there are only two optical transmitters and two optical receivers over the entire path, down from 8 of network nodes with electrical switching cores were used.

The photonic network 10 implementing an embodiment of the present invention uses a cost-effective DWDM optimized switch architecture, which provides the opportunity to introduce both enormous growth and bandwidth-carrying capacity of DWDM into the metro network. In order to implement this architecture we need to provide cost-effective ways of implementing the optical carriers with the frequency or wavelength precision required for a 100 GHz or even 50 GHz on-grid DWDM solution. This has two aspects, one being the precision of the DWDM (dense wavelength division multiplexing), DWDD (dense wavelength division demultiplexing) actual multiplexing, demultiplexing elements and the other being the precision generation of the optical carriers themselves, since these optical carriers have to be centered in the passbands of the individual DWDM channels, if their modulation sidebands are to pass through the DWDM path without significant impairment.

DWDM multiplexers and demultiplexers are rapidly falling in cost and complexity as Array Waveguide technology matures to the point of offering adequate performance. This technology results in a single chip monolithic part that can be manufactured using a silicon wafer processing plant and techniques. Furthermore such parts exhibit accuracies to a few GHz in commercially available devices, making 50 GHz and 100 GHz DWDM applications of this technology highly viable. Such parts often have relatively flat passbands of about +/−12–20 GHz either side of their center frequency. Given that the modulation sidebands may extend out—10 GHz either side of the carrier, this leaves little margin for the combined effects of DWDM filter drift and optical carrier frequency drift, leading to a requirement for a very precise and hence potentially very expensive optical carrier source. Such sources could be placed in the ANs but would then have to be provisioned individually, and would be hard to synchronize due to their remote location, thus requiring more precise free-running operation, further adding to their cost.

Drawbacks of locating lambda sources in ANs

Number of sources needed equals number of access optical carriers central location requires only one source for each utilized wavelength value if splitter & amplifiers are used Inability to lock, sychronize Need for lambda-provisioning, which means the AN becomes lambda-aware Need for lambda verification to check that the AN source has been correctly set Potentially an exposure to a hostile environment, especially in the external outside plant or some CLE equipment rooms.

Figure 2:
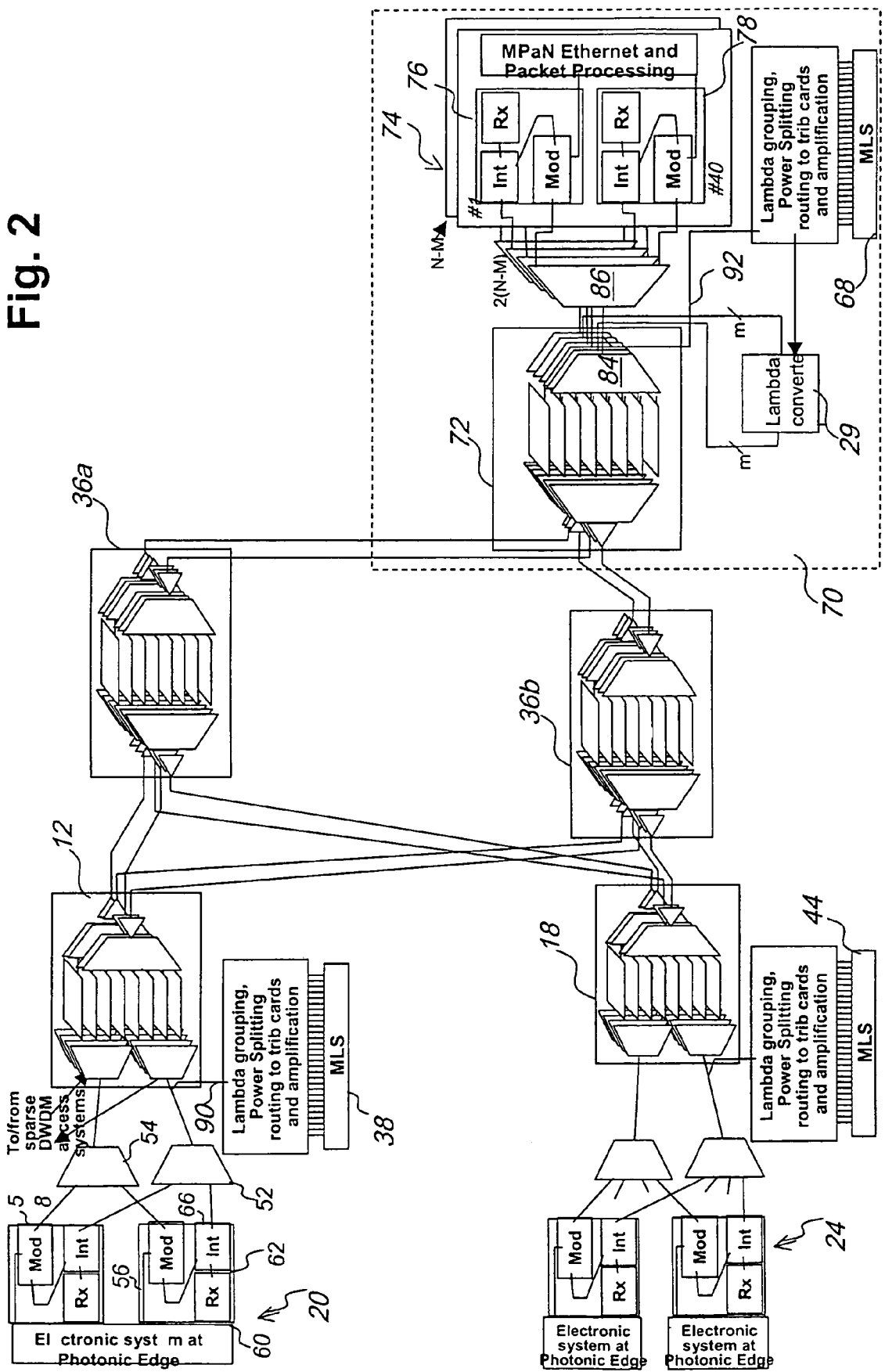
FIG. 2 illustrates in a block diagram a portion of the photonic network of FIG. 1 in accordance with an embodiment of the present invention.

Referring to FIG. 2, there is illustrated in a block diagram a portion of the photonic network of FIG. 1 in accordance with an embodiment of the present invention. In addition to the network elements shown in FIG. 1, FIG. 2 includes more detail for the tandem nodes or central photonic switch 36 a and b and multiple lambda sources 38 and 44 coupled to edge switching nodes 12 and 18 so that the optical carriers only have to transit the access plant (typically 1–3 km) and none of the interoffice trunks (typically 10–20 km), which would give too long a path. The individual multi-lambda sources may be kept synchronized by distributing a reference wavelength.

The photonic path termination and generation within the access nodes 20 and 24 are shown in greater detail. With respect to access node 20 there is included therein coarse WDM (or sparse-DWDM, [S-DWDM]) demux 52 and mux 54, DWDM transponders 56 and 58 and electronic interfaces 60. Each DWDM, transponder for example 56, includes an interleaver 62 a receiver 64 and a modulator 66. The WDM demux and mux only need to be of sufficient quality to handle coarse VWDM, i.e., having a grid spacing of 200 GHz–1 THz (typically 500 GHz) rather than the 50–100 GHz spacing of DWDM. However the access node of the present embodiment can actually be considered to be operating in a "sparse DWDM" mode since the access node uses lambdas of DWDM precision, spaced apart like CWDM. This allows photonic carrier concatenation directly between the access plant with a low number of well separated optical carriers, permitting the use of low cost, low precision optical components, with the closely packed, high efficiency core DWDM optical carrier plan, as long as the actual optical carrier frequency is accurate enough and stable enough. For this reason these are generated centrally and distributed to the access equipment.

In addition, FIG. 2 includes a central core node 70 including a photonic node 72, similar in structure to the tandem node 36 and a metropolitan packet node (or core router) 74 with the central multiple lambda source 68 coupled thereto. The core router 74 has associated large DWDM transponder array, including transponders 76 and 78 that operate in a similar manner to those described with regard to the access node 20. A coupler, interleaver or other multiplexing device 90 connects the multi-lambda source 38 to the access node 12 and a coupler, interleaver or other multiplexing device 92 connects the multi-lambda source 68 to the core node 70. This could be via extra ports of downstream DWDM or even through the switch, but doing so would use up one third of the switch ports. The combining could be done on the downstream portion of the access line card of the switch. For example, in an 8 channel sparse DWDM scenario, we would provide 8 wavelength WDM upstream, and 8+8 channel WDM downstream, where 8 channels are switched through the switch and are modulated with traffic to the ANs and 8 channels are unmodulated carriers from the MLS to be turned round and modulated. These can be passed through 16 channel WDM filters downstream or through broad-lobed 8 channel S-DWDM parts, with both the unmodulated and modulated carriers passing through the same lobe.

One of the functions of the photonic edge node is to "concentrate" the used lambdas from the sparsely filled sparse-DWDM fibers into a proportionally lesser number of more highly filled core network DWDM fibers. For example a switch node may have 20 access port cards each driving 5 fibers with a potential of 8 sparse DWDM optical carriers on each, but the actual utilization level might be only an average of an arbitary 2.3 lambdas per fiber for a total of 230 out of a possible 800 optical carriers. Under such conditions it would be prudent to sub-equip trunk port cards, for example, down from a possible 20 (the same 800 lambdas) to 8 (offering 320 lambdas into which the existing 230 can be mapped and up to another 90 can be added before a further trunk port card needs to be plugged in to the switch.

In operation, all the optical carriers at the various required specific wavelengths needed throughout the metropolitan photonic network 10 are all generated in the photonic layer at edge switching nodes, for example edge nodes 12 and 18 and are allocated out via the edge nodes to the access nodes for modulation.

An unmodulated optical carrier is sent to the access node 20 along with a modulated carrier. The interleaver 62 separates the modulator carrier from the unmodulated one. Typically these would be adjacent wavelengths in the multi-wavelength distribution plan. The modulated wavelength then is passed to the receiver 64 where it is detected and thereby converted from an optical signal to an electrical signal. The unmodulated optical carrier is passed to the modulator 66 where it is modulated by an electrical signal to produce a modulated wavelength for transmission of data back to the photonic switch 12.

Hence, according to an embodiment of the present invention to ensure that the upstream wavelength is both the correct wavelength and is of sufficient precision to enter the DWDM network, the edge node is provided with an optical carrier it is to modulate, from the central multi-lambda source 38. This has the benefit of being substantially cheaper and simpler to implement by eliminating both the need for a complex DWDM individual source in the access node and the need to provision wavelengths in that equipment and monitor for compliance. In effect, the access nodes become optical frequency agnostic and dumbly modulate whatever wavelength the core photonic network sees fit to give them. The centralization of the sourcing of the optical carriers allows six major other benefits in their generation. These are:

Ability to lock to a central network-wide lambda reference

All the optical carriers can be generated in close physical proximity, opening up the possibility of sharing some of the equipment needed to generate them or to stabilize them, lock them or to monitor them.

Each optical carrier can be used multiple times on different access fibers by splitting and amplification.

The optical carriers can be generated in a benign central office environment, even when feeding an outside plant located access multiplexer, resulting in less environmental stress on the design. If necessary, locking the carriers to a reference wavelength can be employed.

There need not be any individual tunable or wavelength administered sources in the access nodes, although such sources (e.g. from third party equipment) can be accommodated as long as they meet DWDM frequency/wavelength precision and stability requirements. The centralized sources can be shared over multiple edge nodes by power splitting, amplification and may result in a lower network cost through simpler lambda administration.

The centralized, central-office located multi-lambda source can readily be fed with a synchronization optical carrier of a specific wavelength or frequency, distributed throughout the interoffice network for this purpose.

While FIG. 2 shows a wavelength plane switch, it should be understood that any photonic switch structure that can achieve full connectivity, between all ports that can be interconnected in a DWDM mode, can be used. Furthermore, it should be understood that, while FIG. 2 shows only a few (2) DWDM feeds out of each side of each switch, there are in fact multiple DWDM feeds to multiple other nodes, to create a mesh, or sparse mesh network, homing in on one or more core nodes as shown in FIG. 1 and in co-pending provisional application entitled "Communications Network for a Metropolitan Area" filed Jun. 1, 2001.

Figure 3:
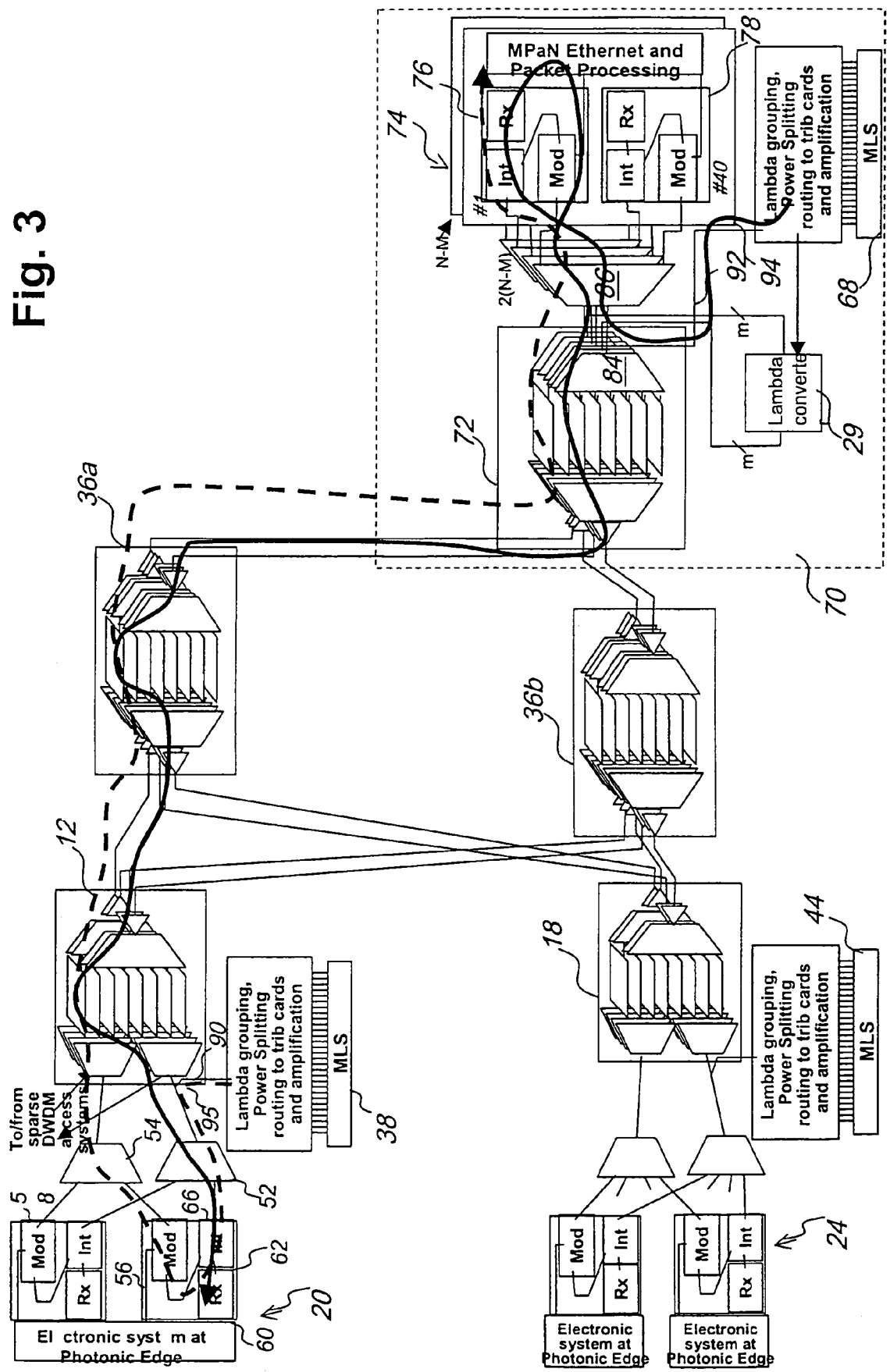
FIG. 3 illustrates in a block diagram the portion of FIG. 2 showing the paths of optical carriers to/from the core node router, from/to the access node.

Referring to FIG. 3, there is illustrated the portion of FIG. 2 showing the optical carrier paths to/from the core node router, from/to the access node. In operation, optical carriers at all required wavelengths or optical frequencies are all generated in the photonic layer either adjacent the core nodes, for example optical carrier 94 at central core node 70 or adjacent the edge photonic switches, for example optical carrier 95 at edge photonic switch 12. The optical carriers (e.g. optical carrier 95) destined to carry information from the access nodes to the core node(s) at the required wavelengths are allocated out to the photonic access nodes for modulation from the access multiple lambda source 38 coupled to access node 12. Similarly, the optical carriers (e.g. optical carrier 94) destined to carry information from the core nodes out to the access nodes are generated at the correct wavelength in MLS 68 and are coupled to the core node 70 for modulation. This embodiment of the present invention has the further advantage of providing wavelengths to be modulated in relatively close proximity to the modulators, while maintaining those modulators as generic, wavelength independent parts without a need for local tunable lasers on the transponders. In the present embodiment, the closest the optical source gets to the modulator is the other end of an access fiber. The optical source suffers some degradation when being transmitted over this fiber, because the signal level of the optical carrier will be attenuated, however other impairments such as chromatic dispersion are irrelevant since there are no modulation sidebands to disperse on the downstream optical carrier transmission prior to modulation. According to this embodiment of the present invention, to ensure that the upstream wavelength is both the correct wavelength and is of sufficient precision to enter the DWDM network, the access modulator is provided with an optical carrier it is to modulate, from the access multi-lambda source 38. Similarly, to ensure that the downstream wavelength is both the correct wavelength and is of sufficient precision to transit the DWDM network, the core node modulator is provided with an optical carrier it is to modulate, from the central multi-lambda source 68.

The core node 70 provides a large service-aware node function needed to handle the partitioning of traffic on a per-service and per-carrier level at the entry to the multiple long-haul networks, and to provide packet-level and sub-lambda level circuit services within the metro area.

The core node acts as a hub for the subtending Metro Photonic Nodes (MPSN's) that provide a flexible and potentially agile method of mapping capacity from the edge nodes to the core nodes.

Figure 4:
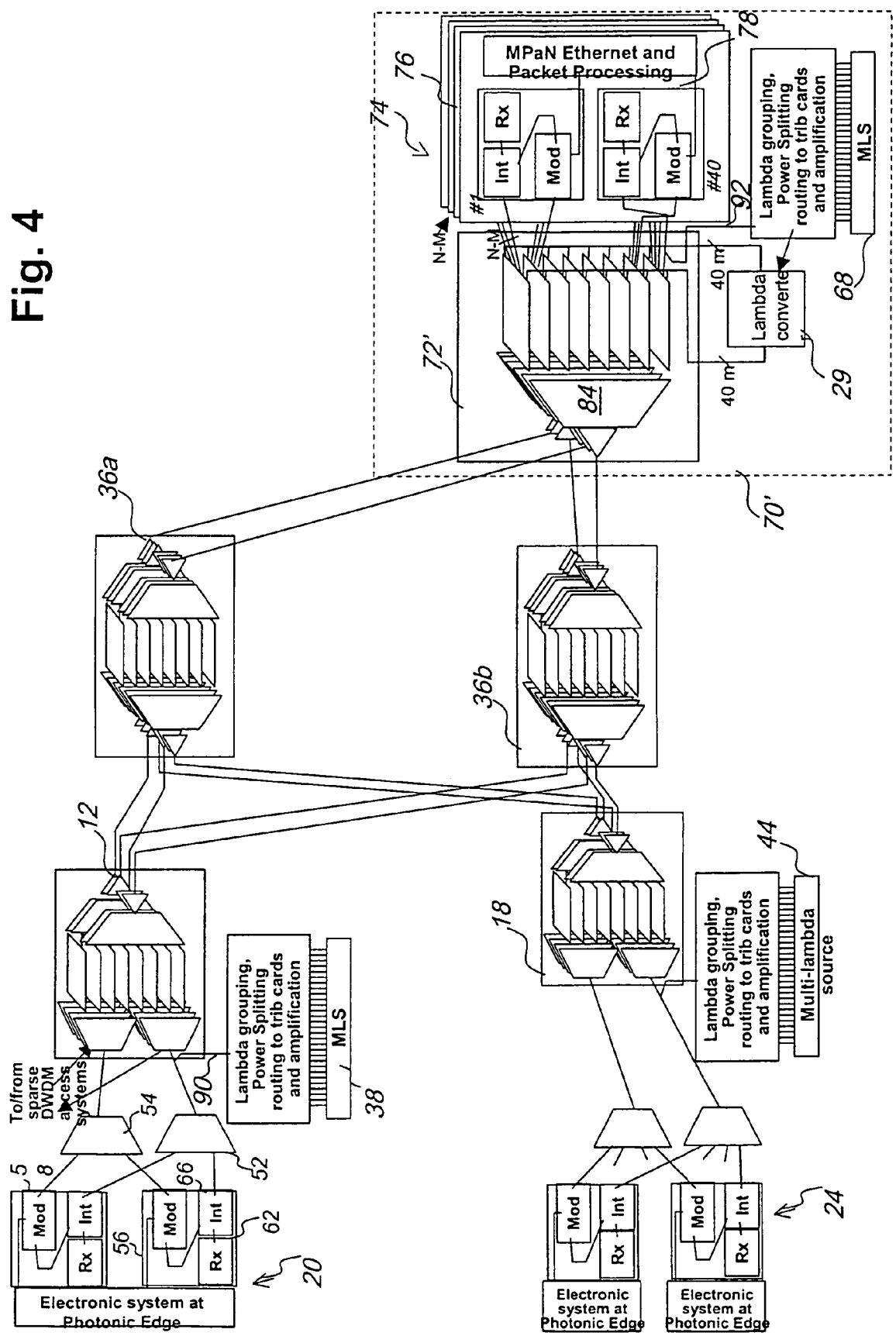
FIG. 4 illustrates in a block diagram a portion of the photonic network of FIG. 1 in accordance with a further embodiment of the present invention.

By providing multi-lambda source as central wavelength resource the edge nodes:

Permit passive modulation at the customer premises by providing the required precise optical carrier to the CPE, instead of demanding that a high precision DWDM-compatible tunable laser be provided Eliminate/automate lambda provisioning since, with the removal of that laser, the residual components can be optical frequency agnostic Referring to FIG. 4, there is illustrated a portion of the photonic network of FIG. 1 in accordance with a further embodiment of the present invention.

FIG. 4 shows a variation on the structure of FIG. 2, for the case of close physical location of the router/data switch 74 and the Photonic switch 72 of the core node 70. In this case the back-to-back DWDM multiplexing 84, demultiplexing 86 can be eliminated, for a potential saving in cost. Note that the lambda converter 29 can also be treated the same way.

Figure 5:
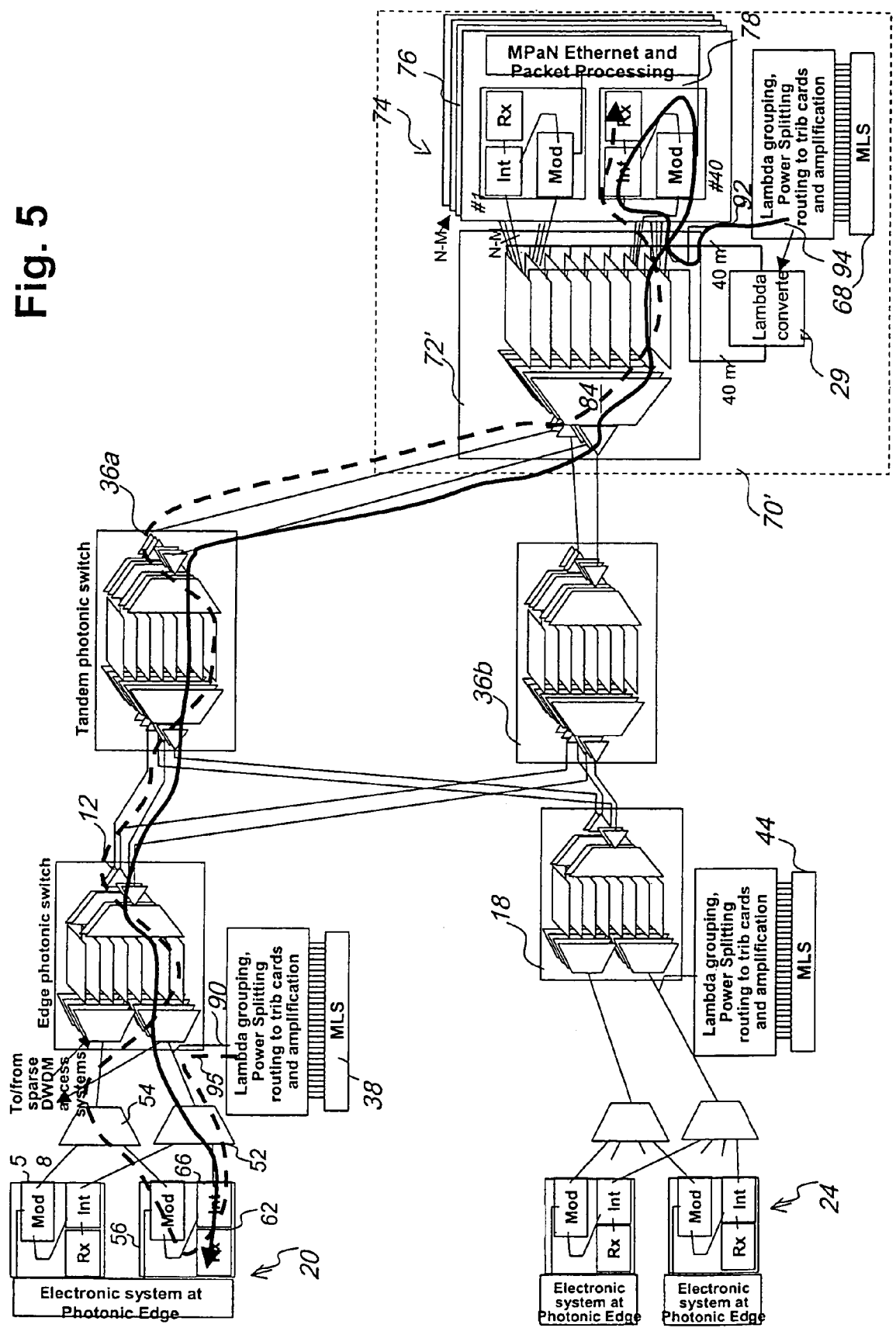
FIG. 5 illustrates in a block diagram the portion of the FIG. 4 showing the paths of optical carriers to/from the core node router, from/to the access node.

Referring to FIG. 5, there is illustrated the portion of FIG. 4 showing the paths of optical carriers to/from the core node router, to/from the access node. FIG. 5 is similar to FIG. 3, but shows the paths for optical carriers 94 and 95 for the embodiment of FIG. 4.

Figure 6:
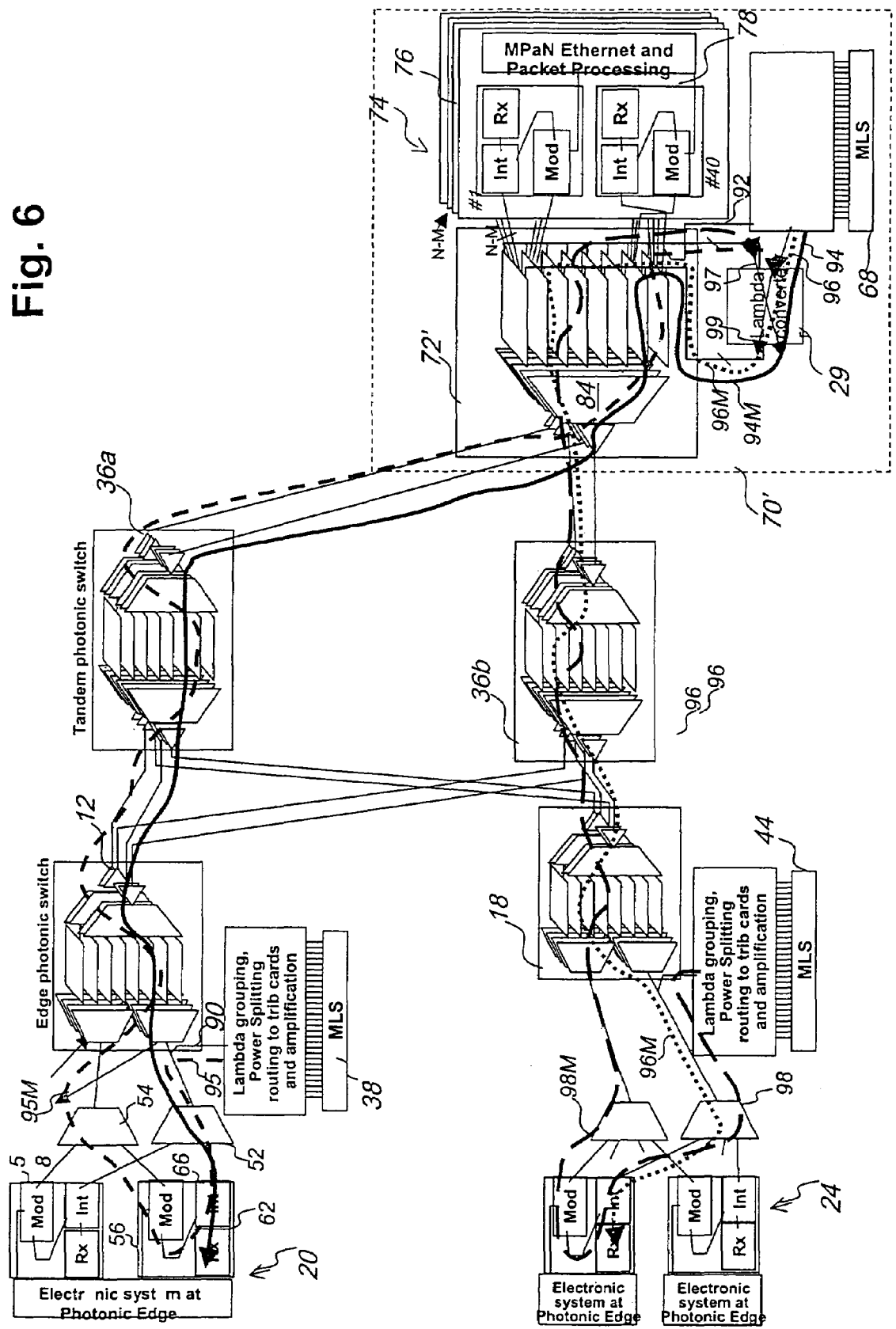
FIG. 6 illustrates in a block diagram a portion of FIG. 4 showing the paths of optical carriers to/from the core node lambda converter, from/to the access node.

Referring to FIG. 6, there is illustrated the portion of FIG. 4 showing the paths of optical carriers to/from the core node lambda converter, to/from the access node. The unmodulated carriers 94 and 96 from the core node multi-lambda source 68 are input to the lambda converter 29 for modulation. The modulated carrier 95M from access node 20 is also input to lambda converter 29, wherein the modulated carrier 95M is received to produce an information signal 97 that is used to modulate optical carrier 96 to produce modulation optical carrier 96M that is conveyed to access node 24.

Similarly, the unmodulated optical carrier 98 generated at MLS 44 is modulated in access node 24 to produce a modulated optical carrier 98M is received at the lambda converter 29 to produce an information signal 99 that is then used to modulate the unmodulated optical carrier 94 to produce a modulated optical carrier 94M, then conveyed to access node 20. In this way end-to-end lambda-based communications are established between access node 20 and 24, without having to provision for non-blocking of lambdas on an end-to-end basis. The network need only be provisioned for edge-to-core non-blocking lambdas.

Figure 7:
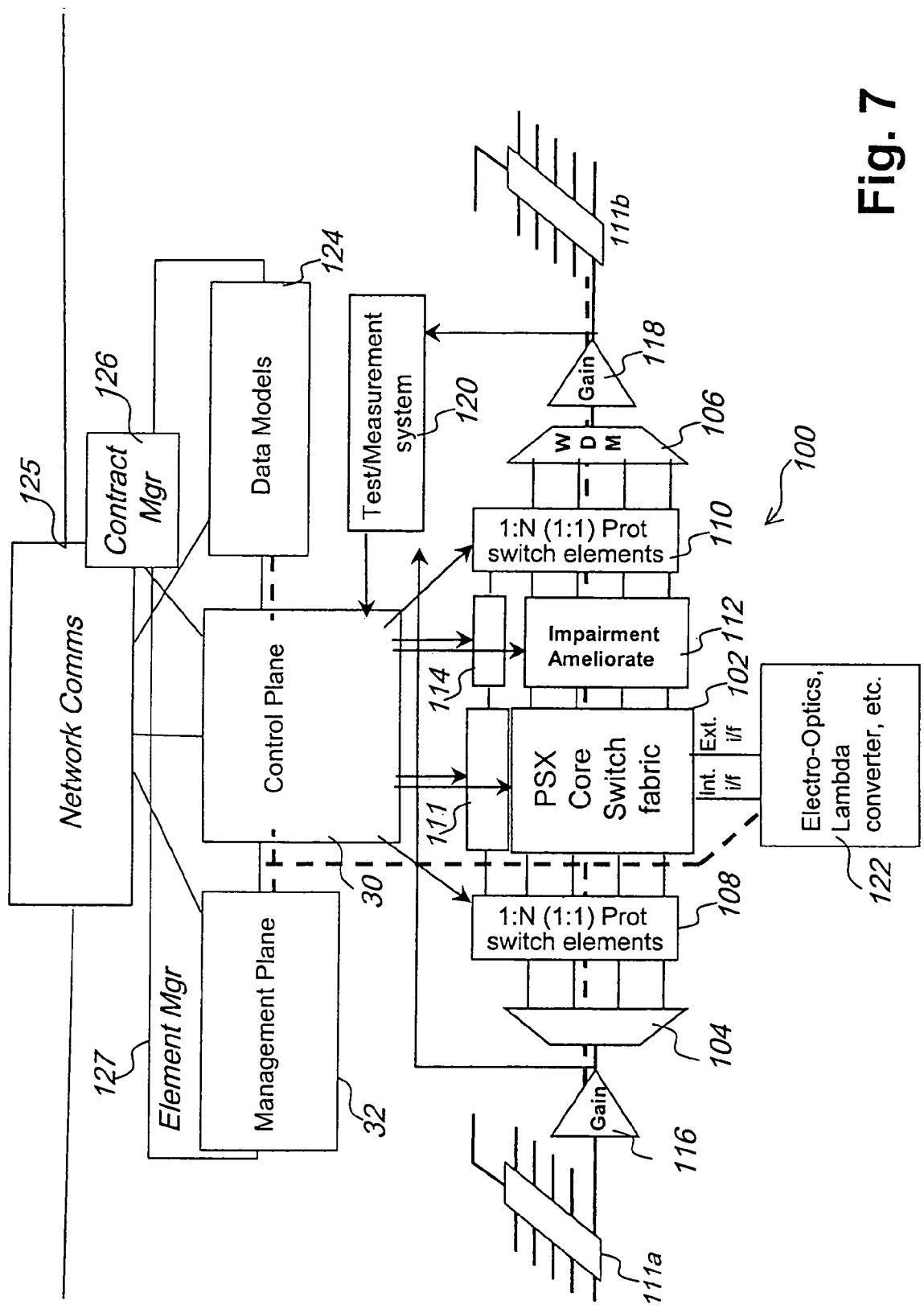
FIG. 7 illustrates in a block diagram a metro photonic switch for the photonic network of FIGS. 1–6.

Referring to FIG. 7, there is illustrated in a block diagram a metro photonic switch, in accordance with an embodiment of the present invention, for the photonic network of FIGS. 1–6. The metropolitan photonic node 100 includes a photonic switch core fabric of "N" independent, replaceable blocks, 102, arrays of WDM demux 104, WDM mux 106, with both the WDM mux and WDM demux existing in several forms, according to whether they are feeding DWDM ore fibers or access S-DWDM fibers or other access structures, including single carrier per fiber solutions, a 1-N switch core protection switch 108, a second 1-N switch core protection switch 110, a protection plane 111, (port card protection switches 111a and b, which bypass traffic from a failed port card to a spare one), an impairment compensator block 112, for the switch core, a second impairment compensator 114 for the protection plane, both of which operate under control of the test and measurement system 120, an input WDM optical pre-amplifier 116 and an output WDM optical power amplifier 118, a test and measurement system 120 which performs the checks and analyses required to determine the settings for the compensation blocks and to generally monitor and alarm the outgoing optical carriers, for instance for loss of an optical carrier or for a misconnection within the switch, and electro-optics 122, which both provide any optical carrier add-drop into the electro-optic domain and access a lambda converter, currently implemented in electro-optic technology. The switch is controlled by the control plane 30 and management plane 32 based upon data models 124, which contains the connection maps, link conditions, etc. for the surrounding environment. The management plane 32 and the control plane 30 and the data models 124 are supported by network communication 125 and provide contract manager 126 and element manager 127.

For simplicity, the photonic network node 100, as shown in FIG. 7, is shown having a DWDM demultiplexer on the input side and a S-DWDM multiplexer on the output side. Actual implementation of this switch could include a mix of inputs and outputs of both DWDM and S-DWDM which would be physically provisioned as different tributary line cards. To permit lambda concentration more capacity may be offered into/from the switch node on the access side than on the trunk side. For example in a case where 8 channel S-DWDM is used in the access and 40 channel DWDM is used in the core, then with no concentration every five access fibers would require a core fiber, but, if, as an example, on average only 2 of 8 wavelengths in the access are in service/lit, then the number of core fibers can be reduced from one per five access fibers to one in 20 (in practice one in fifteen), to allow better use of the core DWDM network. Then, as more access wavelengths get lit, extra capacity can be added in the form of more core fibers, core trib cards. As drawn the input side of the node would be connected to the core network carrying DWDM traffic hence the gain 116 is applied to traffic coming into the node from the core network. DWDM demultiplexer 104 then demultiplexes this traffic into individual wavelengths and protection switch 108 provides 1-N protection in the event of failure on the switching core for one wavelength. The switching core 102 switches the wavelengths to the desired output ports that then pass through the impairment monitor block 112 to ensure operation of the switch and proper optical characteristics of that particular wavelength output port. The output ports are also protected by the 1-N protection switch 110 prior to being multiplexed using wavelengths division multiplexer 106 for passing to the access side of the network. The electro-optics block 122 is provided for in the optical-electrical conversion of wavelengths for the purposes of service adaptation, regeneration, wavelength conversion, electrical cross connection or monitoring. The control plane 30 controls switch end connections, switch configuration, protection and restoration, test access and impairment compensation. The management plane provides network management system, configuration, performance, faults, events handling and testing. The data models 124 include network and node topology, optical link status, maps of used, unused lambdas on each port, status of adjacent nodes, connection algorithms as a function of traffic or service class, network management, and connection control. The test measurement system 120 monitors the spectral power path integrity and may include chromatic dispersion monitoring.

While the core fabric is shown having N lambda-plane switches when initially installed in a network this switch can be sub-equipped with lambda switch planes, for example, if we have a 40 lambda, 16×16 fiber node, switching 640 lambdas total, we can sub-equip switch ports linearly, fibers and switch planes with utilized lambdas. Hence, in an early deployment, where the node need only support 15 lambdas on each of 5 fibers, then only 15 of 40 switch planes and only 5 of 16 port cards need be deployed, giving a lower start-up cost and allowing cost to be added as switch capacity grows, deferring investment.

Figure 8:
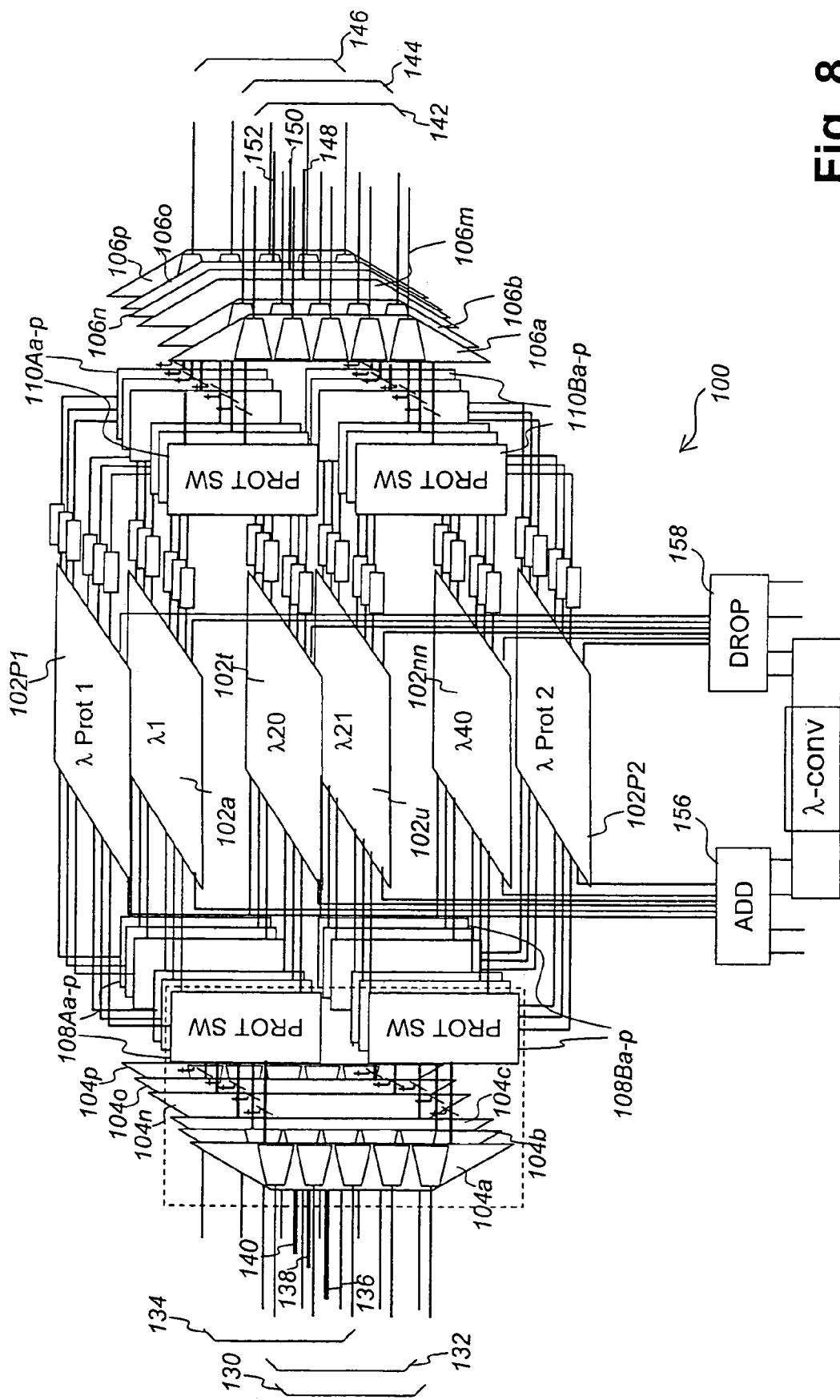
FIG. 8 illustrates in a block diagram a portion of the metro photonic switch of FIG. 7 in further detail.

Referring to FIG. 8, there is illustrated in a block diagram the portion of node 100 between and including the DWDM and S-WDM portions thereof in greater detail. DWDM demultiplexer 104 is illustrated as a mix of 16 DWDM and S-WDM multiplexers 104a–104p. The 1-N protection switch 108 is shown as a plurality of pairs of protection switches 108A (a–p) and 108B(a–p). The photonic switch core 102 is illustrated as separate wavelength planes 102a–102nn and including two protection planes 102P1 and 102P2. On the output side protection switch element 110 is illustrated as a plurality of pairs 110A(a–p), 110B(a–p). The output multiplexers 106 are illustrated as a mix of 16 S-WDM and DWDM multiplexers 106a–106p. Output ports for each switch core wavelength plane 102a–n and protection planes 102P1 and 102P2 are provided with erbium-doped waveguide amplifiers 129 or variable optical attenuators, dependent upon the required average node optical path loss. In either case the purpose of these components 129 is to allow the level of each optical carrier to be adjusted so that the resultant S-WDM, DWDM multiplexed carrier at the switch output has equal optical power in each of the optical carriers, which optimizes the overall system performance.

Input demuxes 104a, 104b, and 104p represent optical demuxes/trib cards for incoming access fibers, which have relatively low optical carrier counts, which are implemented as S-DWDM demuxes and each include five S-DWDM demuxes, one of each of the five different 8 channel wavelength plans. Similarly output muxes 106a, 106b and 106p represent S-DWDM muxes each including five S-DWDM muxes. Input demuxes 104m, 104n and 104o represent DWDM muxes. Input fiber groups 130, 132 and 134 are connected to S-WDM demuxes 104a, 104b, and 104p, respectively. Output fiber group 142, 144 and 146 are connected to output S-WDM muxes 106a, 106b and 106p, respectively. Input fiber 136, 138 and 140 are connected to input DWDM demuxes 104m, 104n and 104o, respectively. Output fibers 148, 150 and 152 are connected to output DWDM muxes 106m, 106n, 106o and 106p, respectively.

In operation, the input side of metro photonic node 100 includes S-WDM traffic from the access site of the network as represented by input fiber groups 130, 132 and 134. Each fiber group includes five fiber and each fiber carries up to 8 wavelengths for a wavelength plan of 40 wavelengths. Each fiber in a group is connected to a respective S-DWDM demultiplexer of 104a, 104b and 104p. The DWDM traffic on the input side represents core network traffic. This traffic is shown as covered and DWDM fibers 136, 138 and 140. The mix of DWDM and S-WDM demuxes on the input depends upon connectivity within the core network and on the extent to which the access network has been built out. In the example of FIG. 5, with 16 input demuxes, four input DWDM could be used for connection to three adjacent nodes, while the remaining 12 were provided for access fiber groups, which would result in a 3:1 wavelength "concentration". Each of the DWDM fibers includes up to all 40 wavelengths of the wavelength plan.

For simplicity, in FIG. 8 the electro-Optics block 122 is illustrated as ADD and DROP blocks 156 and 158, respectively, though a wavelength converter or lambda converter can readily be connected across the drop and add ports to change the wavelength of a signal passing through the photonic network in conjunction with two passes through the photonic switch fabric. Such lambda converters were detailed in (Graves Hobb 1999).

In operation, the protection switch elements 108 on the input side protect the outputs of the demultiplexers 104 in the event of the failure of one of the switch planes 102a–n with the core being split such that 108A elements protect wavelengths lambda 1 to lambda 20 and protection switch elements 108B protect lambda 21 through lambda 40. In the event of a failure in switch planes 102a for lambda 1 through lambda 20 protection switch plane 102P1 is provided for protection for lambdas 21 through 40 protection switch plane 102P2 is provided. When switched from a regular switch plane 102 to a protection switch plane 102P on the input side of a corresponding protection switch by protection switch elements 108A or 108B must be made on the output side by protection switch elements 110A or 110B. Although not shown in this figure, for clarity, means are provided for testing the protection plane when the switch is not in protection mode and of testing the failed or replaced plane, when traffic is bypassing it, for fault diagnosis and test purposes. The details of this protection arrangement are disclosed in co-pending application titled "Protection Switching Arrangement for an Optical Switching System", Ser. No. 09/726,027 filed Nov. 30, 2000 and assigned to the same assignee as the present application.

Figure 9:
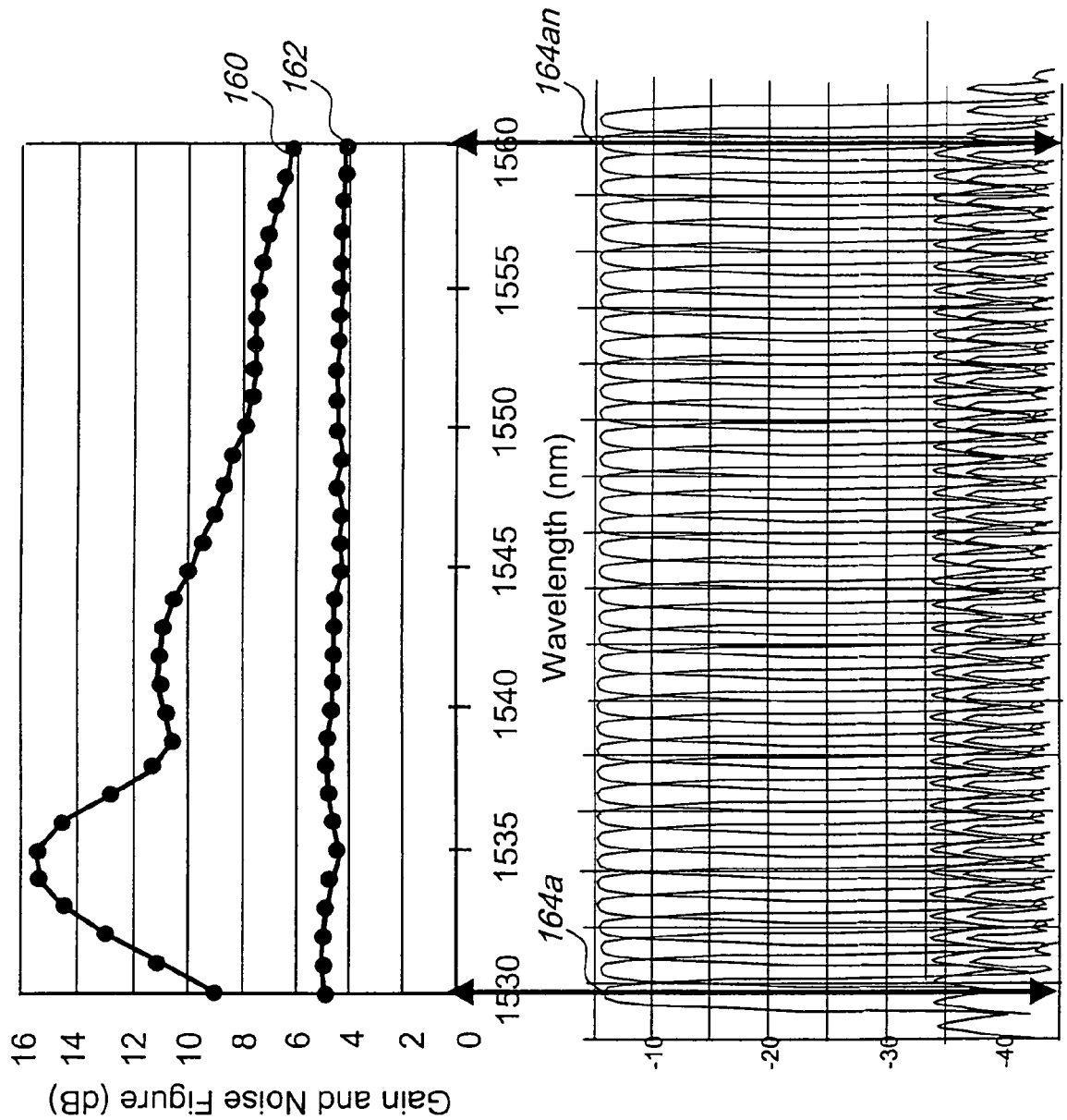

Referring to FIGS. 9a and 9b, there is graphically illustrated a wavelength plan for the network of FIGS. 1–3 and response as a function of wavelength for exemplary erbium-doped waveguide amplifiers for implementing the wavelength plan of FIG. 9a.

FIG. 9b shows that the gain for typical Erbium-doped waveguide amplifiers or EDWA's. FIG. 9b shows that the gain for the Erbium-doped waveguide amplifiers is non-constant across the wavelength spectrum used in the core network. As indicated by the curve 162 the noise figure is relatively constant across the wavelengths while the gain as illustrated by line 160 varies with wavelengths. Consequently, using EDWA across the entire spectrum would not result in equal amplification without a complex complementary filter whereas using arrays of EDWA for individual channels in the wavelength plan of FIG. 9b, or a small group thereof, allows each amplifier in the array to be set to the appropriate gain, which provides a much more uniform amplification of the wavelengths used, as well as a method for removing level inequalities due to other sources, by actively controlling the gain of each EDWA, based upon a feedback loop, derived from the output power spectrum.

The current EDWA technology has enough bandwidth to cover 1529–1562 nm with a minimum best gain of 5.5 dB although the industry is improving the gain, flatness, power handling and bandwidth of these parts. Because its current gain flatness is very poor across the band, it has to be limited to small groups or individual wavelengths/carriers, which makes it suitable for amplifying individual carriers, for example to gain-flatten the node, but makes it inappropriate for use as the output power amplifier of the DWDM combined signal, which remains an application for conventional optical amplifiers. Its noise figure is relatively independent of wavelength across the band at ~5 dB. Future EDWA's may be expected to have a higher maximum gain and flatter broader bandwidth.

Figure 10:
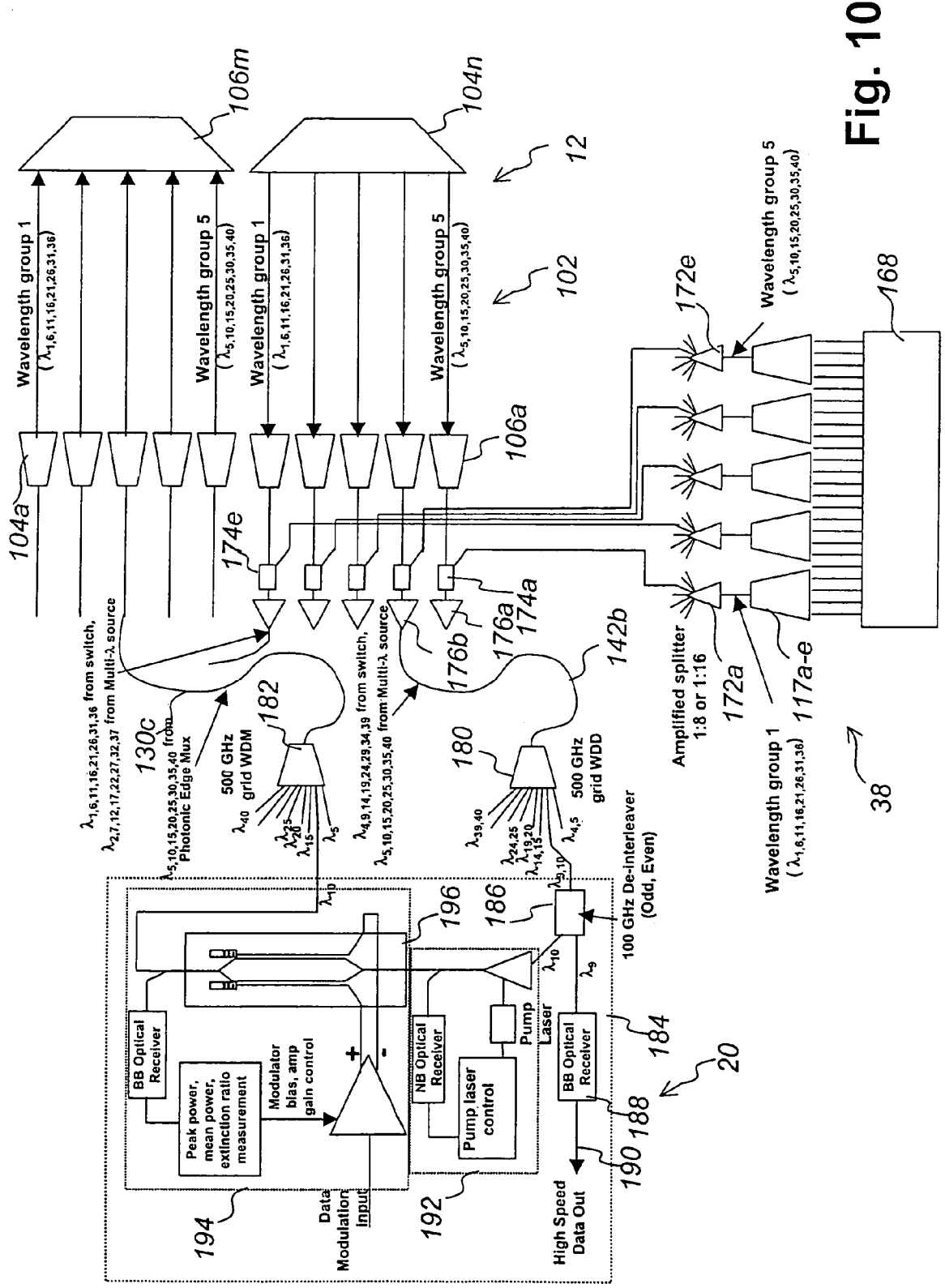
FIG. 10 illustrates in more detail, a portion of the network of FIGS. 1–6 showing wavelength distribution at the access portion thereof.

Referring to FIG. 10, there is illustrated, in more detail, a portion of the network of FIGS. 1–6 showing wavelength distribution at the access portion thereof. The network portion includes edge node 12, access node 20 and multiple lambda source 38, each shown in further detail to illustrate one simple method of lambda distribution in the access portion of the network, recognizing that more sophisticated schemes are also possible. The edge node 12 includes a DWD Demultiplexer 104n and DWD Multiplexer 106m on the dense wavelength distributed (DWD) core side of the network and plural sparse DWD Multiplexers 106a and DWD Demultiplexers 104a on the access side of the network. There is a fundamental relationship between the number of optical carriers (W) and their grid spacing (X GHz) on the DWDM trunking side of the switch and the number of carrier grid slots (Y) per access fiber, their grid spacing (Z GHz) and fiber fan-out (number of access fibers that can be fully supported from each core fiber—S) and the provisioning ratio/"concentration ratio" between the access and core fiber plant (T % of access slots supported in the core network) for a given number of core, access fibers, U, V respectively. These relationships are:

i) The number of wavelength slots supported on an access fiber is Y=W/S ii) The grid spacing in the access Z=X*S=X*W/Y iii) The percentage of potential optical carriers in the access that can be illuminated for a given level of trunk, access fibers is T=100*S*U/V Different solutions to these equations give different access capacities, access grid spacings and average "concentration" due to filling core trunking DWDM pipes from under-filled access fibers. Both Z=400 GHz and Z=500 GHz examples are used in this document, as illustrations of the flexibility possible, the Z=400 GHz example being associated with the mapping from 40 ch DWDM to 10 channel S-DWDM, and Z=500 GHz being associated with mapping from 40 ch DWDM to 8 channel S-DWDM. The following example will use a 500 GHz spacing. Practical spacings range from 400 GHz to 2 THz, corresponding to 10 channels down to 2 channels, with practical solutions at 10, 8, 5 4, 2 channels, with spacings of 400, 500, 800, 1000, 2000 GHz.

The optical plane switches of access node 12 are represented by arrows 102 to reduce the complexity of the drawing. The access node 20 includes sparse-DWD (in this example a 500 GHz grid is used) wavelength distributed demultiplexer 180 and multiplexer 182, a broadband optical receiver 186 and an output for high-speed data 190. The optical port card 184 also includes a carrier power stabilization loop 192 and a modulation depth and power stabilization loop 194. The modulation loop 194 includes a modulator 196.

In operation, the Multi-Lambda Source 38 generates 40 optical carriers on the standard ITU 100 GHz grid by means described in co-pending application (MLS synch) or equivalent alternative means. The wavelengths from the MLS 38 are grouped or multiplexed by multiplexers 117 into 5 groups of 8 wavelengths that are of the same wavelength composition as the downstream sparse-DWDM frequency plan on the access side of the edge node 12. These groups are fed through amplifying splitters 172, (such as an amplifying 8-way splitter such as that manufactured by TEEM Photonics, of Grenoble, France) or combinations of discrete amplifiers and splitters. The individual optical feeds are fed into the appropriate outgoing ports via a coupler or interleaver device 174. It is important to note that, for the access fiber port with "wavelength plan 1" downstream wavelengths, the unmodulated wavelengths from MRS 38 are not from wavelength plan 1, since this would overwrite the downstream data, but are from one of the other wavelength plans 2–5. In the present example wavelength plan 2 is used for the unmodulated carrier wavelengths. This results in eight groups of two wavelengths (one being a downstream signal, the other an unmodulated carrier) being generated with an inter-group spacing of 500 GHz (allowing relatively coarse demultiplexers 180 in the outside plant), with an inter-carrier spacing between the two carriers in the group being a constant 100 GHz. The entire optical structure consisting of eight 500 GHz spaced downstream data streams and eight downstream unmodulated carriers is propagated over the outside plant fiber plant, for example optical fiber 142*b*, to the far end optical sparse-DWDM demultiplexer 180, a 500 GHz channelized optical demux, that drops lambdas 9 and 10 into the optical port card 184 of access node 20. The 100 GHz grid optical interleaver 186 (a recursive optical device such as a resonant cavity) separates the odd numbered and even numbered wavelengths into two separate streams, in this case separating the two wavelengths lambda 9 and lambda 10. Lambda 9 carries the downstream data and is fed to the downstream optical data receiver 188, received, converted into an electronic signal and passed via the output 190 into the access node electronic circuitry (not shown in FIG. 10) or other photonic network terminating device into which this functionality can be built.

Meanwhile lambda 10, being the optical carrier for the upstream path is passed to the modulation area of the upstream transmitter. The optical carrier lambda 10 passes through the carrier power stabilization and/or amplification loop 192 to ensure that a constant known power level is passed into the modulator 196. This loop may be implemented as a compact EDWA integrated into the same substrate as the modulator, especially if that modulator is a Mach Zehnder modulator fabricated on a Silicon or silica substrate and based upon an electro-optic polymer approach, since this could be fabricated in series with the Silica waveguide required for the EDWA. However, the modulator 196 can take many forms, such as an electro-absorbsion modulator, but the modulator shown here is an electro-optic Mach-Zehnder modulator, that can be implemented in Lithium Niobate, Indium Phosphide, or as an electro-optic polymer modulator. The modulator also operates within a series of feedback loops, forming the modulator depth, power stabilization loop 194, the nature of which is determined by the properties of the chosen modulator technology. Typically, with a MZ modulator 196, there is a peak power control and an extinction ratio control, controlling the brilliance of "1"s and the closeness to darkness of "0"s, respectively. The output from this passive modulator is then fed through an inverse of the incoming optical demultiplex, in the appropriate wavelength port and is fed via optical fiber 130*c* upstream to the edge node 12. Here the upstream modulated lambda 10 is passed through an access-side port card (not shown in FIG. 10) to the switch core and is coupled straight into the outgoing DWDM multiplexer 106*m* of the switch. The optical carrier must be of a frequency that directly aligns to the outgoing DWDM grid on the trunk side of the switch. This is accomplished by ensuring that the optical carrier originates in a Multi-lambda source that is of an appropriate precision. The precise optical carrier is then fed out to the access point, is modulated and returned to the network, having not undergone any modifications that can shift it's optical carrier frequency.

Figure 11:
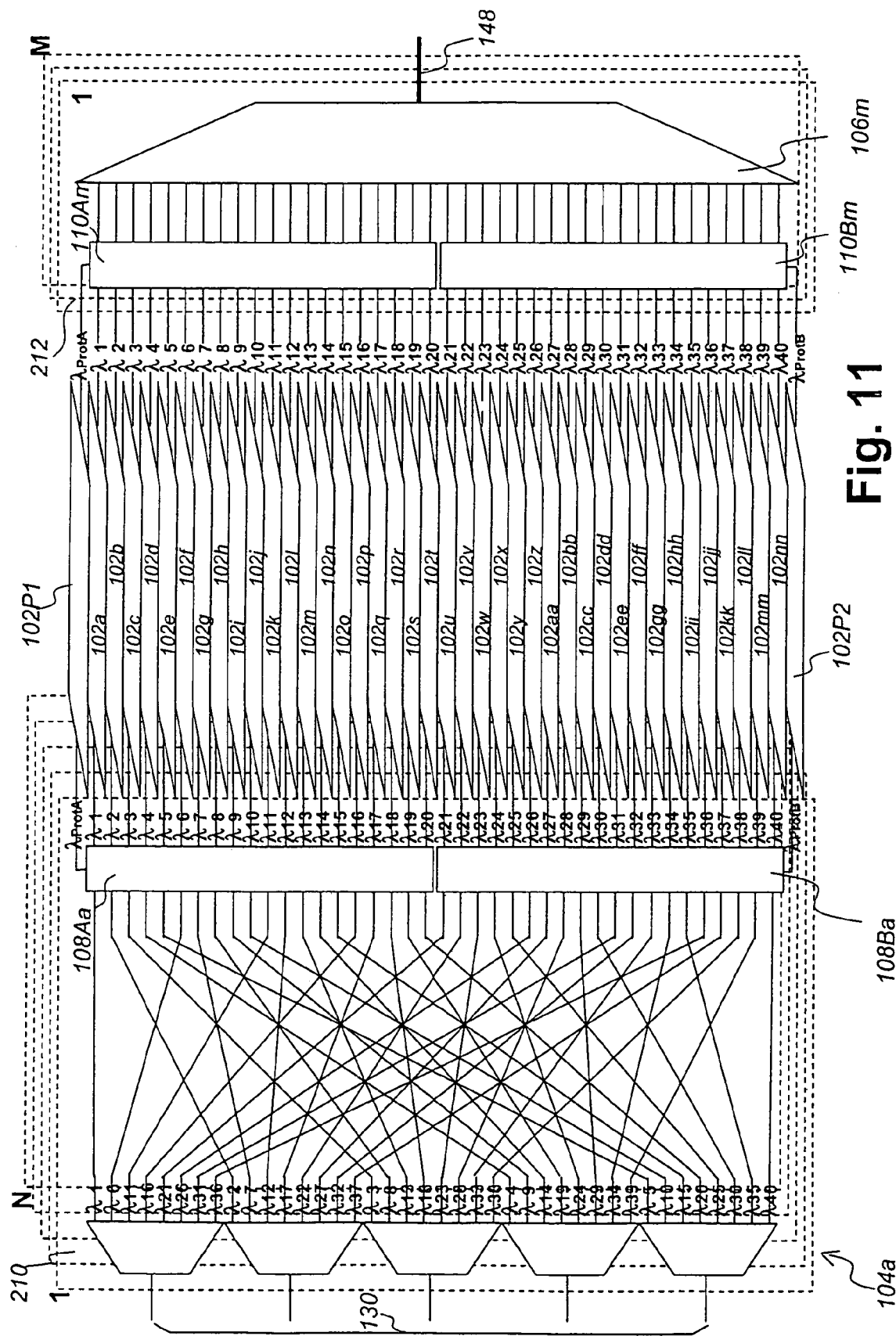

Referring to FIG. 11, there is illustrated an example metropolitan photonic network switch configured for implementing the wavelength plan of FIG. 9*a*. This wavelength plan includes 40 wavelengths with 100 GHz spacing in the core network and on the access side five groups of wavelengths, each group having eight wavelengths spaced 500 GHz apart.

Metropolitan photonic switch 100 includes a plurality of access cards 210 each access card including five WDM demuxes 104*a* and two protection switches 108Aa and 108Ba. The switch core 102 includes protection switch planes 102P1 and 102P2 and lambda switch planes 102*a*–102*nn*.

The DWDM side of the switch includes a plurality of trib-cards 212. Each trib-card including two protection switches 110Am and 110Bm and a DWDM multiplexer 106*m*.

In operation, a wavelength input to access card 210 via fiber group 130 including five fibers each carrying up to eight wavelengths. The wavelengths are demultiplexed into individual wavelengths and cross connected direction shuffled into wavelength order for input to the protection switches prior to input to the appropriate lambda plane switch. On the output of the lambda plane switch the ports are similarly protected by protection switches 110A and 110B before being coupled to the output DWDM multiplexer which outputs the single fiber having 40 100 GHz spaced DWDM channels. Note that, by changing the ratio of N to M (or U to V in the earlier equations) a variable level of concentration can be introduced, permitting very few trunk DWDM fibers to support a very large number of access fibers, especially in the early deployment phases, when the access fiber has been deployed but relatively few customers have yet signed up, and hence most of the access capacity is "dark" latent capacity, but we still want to efficiently fill the DWDM core plant. As more subscribers sign on the traffic handling of the node can be reinforced simply by adding more trunk port cards to the switch node. The level of trunk port traffic handling should of course be maintained at a level about 30% above that of the access plant actually in use, to permit some excess bandwidth capacity for the agile lambda control system to provision into, but this is a small over-capacity in comparison to the capacity savings possible due to the sub-provisioning of trunk port cards. In order to implement a practical "lambda-on-demand" network, whereby end users can request the initial illumination of an erstwhile dark wavelength, a method of signaling from the end customer premises to the switch node and on to the O-UNI is required. This is done at 1310 nm, signaling into the Ethernet communications hub located at each switch, since all 1310 nm communications signals are hubbed to this point, treating it as a 100 bT LAN hub with outlying optical terminations as "terminals" on the 100 bT network. This is shown and described in more detail under FIG. 9.

Figure 12:
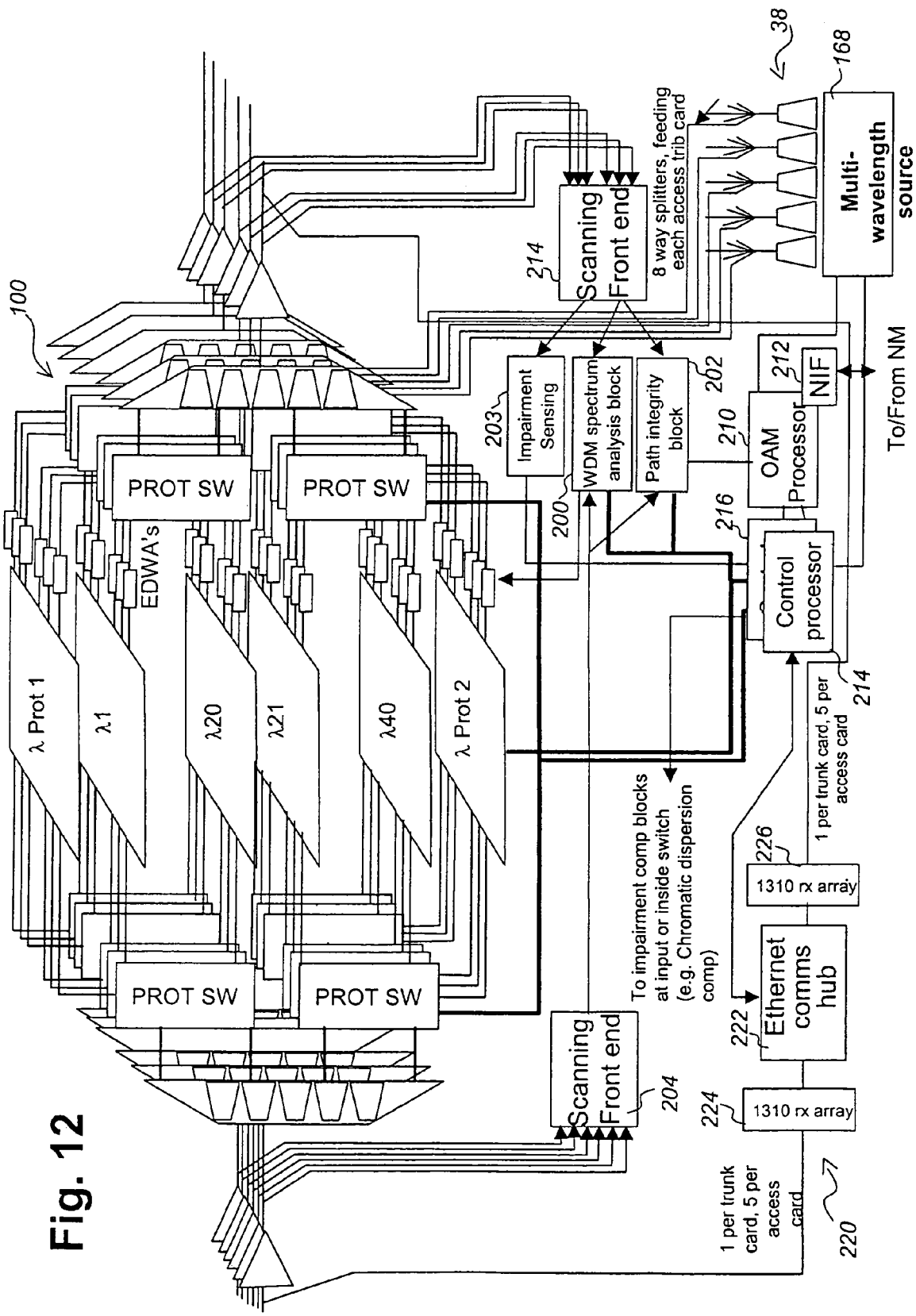
FIG. 12 illustrates in a block diagram, the metro photonic switch of FIG. 8 showing further detail.

Referring to FIG. 12, there is illustrated in a block diagram the metro photonic switch of FIG. 8 showing further detail. Referring to FIG. 12, there is illustrated a photonic metro node including all components for a practical implementation, with the exception of the electro-optic add-drop and wavelength converters, which in any case are not required in the majority of nodes in the network of FIG. 1 and which were shown earlier, on FIG. 8. In addition to those components shown in FIGS. 7 and 8, FIG. 11 includes a detail of the Ethernet control linkages for the metropolitan network implementation. This figure also shows the application of the multi-wavelength source outputs to the network node. Specifically, the impairment control block 112 is expanded to show a wavelength division multiplex spectrum analysis block 200, a path integrity block 202 and an impairment sensing block 203. A chromatic dispersion discrimination block, in conjunction with a chromatic dispersion compensation system could also be added. Each receives input from scanning front ends 204 and 206 tapping signals for input and output fibers.

In operation, the WDM spectrum analysis block, in conjunction with the scanning front end 214, periodically measures the output power levels in each optical carrier of each output WDM feed. Any measured departure from the correct power level for any given carrier is detected and corrected by sending a correction to the appropriate EDWA associated with that optical carrier, so as to restore that optical carrier to the correct level. This can be a relatively slow process (scanning every few seconds) since the mechanisms that are likely to cause level drift are slow in nature. However there is a time when this scanning slow adjustment process has to be interrupted, and that is when a switching action takes place in the switch. Because the input powers of signals into the switch have either unknown levels or a tolerance on their levels, and because the line optical amplifiers change their gain in a transient manner in the number of optical carriers suddenly changes, special considerations are required when taking down or setting up a new switch path. When an old path is to be taken down and a new path is to be established, then the EDWA associated with the old path is commanded to reduce its gain down to minimum, in a ramped manner, such that the external amplifier control loop can adjust for the loss of that carrier or carriers, and not disturb the remaining in service carriers. The EDWA associated with the new switch path also has it's gain set to minimum. Then the scanning spectrum analyzer in stopped from scanning and is "camped" on the new path output, the switch is made and then the EDWA gain is slowly ramped up, so as not to "shock" the output amplifier, the gain being ramped up until the "camped" spectrum analyzer sees the correct output level. At this point the EDWA gain is fixed and the normal scanning cycle resumes. The impairment sensing block can also be fed with the output of the scanning front end and hence can be connected in parallel with the WDM spectrum analysis block to any output fiber and lambda,. The impairment-sensing block may consist of a chromatic dispersion discriminator such as is filed under co-pending application Ser. No. 09/842,236 filed Apr. 26, 2001 or may take other forms. The output of this block may be used to take automatic corrective action (e.g. the dispersion discriminator may control a dispersion compensator) or may provide parametric data for the analysis by, and action by the OAM system.

An OAM processor 210 with a network interface (NIF) 212 coupled to the network management system is coupled to the path integrity block and controls protection switching via control processors 214 and 216. The control processors are also in communication with the Ethernet communication 220 including Ethernet communications hub 322 and a pair of 1310 nm transmitter/receiver arrays 224 and 226. The transmitter/receiver arrays associated with access fibers, are connected to multiple customer premises Ethernet transceivers via optical splitters that bypass the outside plant or CPE located Sparse-DWDM multiplexers and provide a means to allow a network access end point currently associated with a "dark" wavelength to request illumination of that wavelength and the establishment of an end-to-end path. This process is similar to dialing in a conventional telephone network, where the act of picking up the phone and dialing both establishes a requirement for an end-to-end connection and the allocation of a DS-0 time slot within the switch.

In operation, the metro photonic switch 100 provides both traffic flow to/from the access plant, and it interoffice trunk DWDM connections, both for the purposes of connecting to the access and for tandeming through the switch node to other photonic switches. The control plane of the switch is connected to an Ethernet communications hub 222. The Ethernet hub 22 is "Ethernet switch" built in to the metro photonic node for the purposes of communicating control messages and lambda set-up signaling with other nodes, with the Optical-UNI server and the photonic path end-nodes. The Ethernet Hub 22 is connected to at least one fiber per route to each of its nearest neighbour switches and each access Ethernet Multiplexer, with 100 base-T 1300 nm optics that are coarse WDM (band-WDM) coupled on to incoming and outgoing fibers on the switch. The fiber links will have a much higher attenuation at 1300 nm (typically 0.5–0.7 dB/km versus 0.15–0.25 dB/km at 1550 nm) but this is not a problem since the much lower bit rate of 100 baseT transmission will accommodate a much higher link loss and links are not photonically tandemed since the control/signaling must be intercepted at each node to extract/insert the relevant Ethernet traffic to/from that node. Another addition is the co-location of a multi-lambda source with the switch in the central office. Whilst the "round-robin" dealing-out of wavelengths cross the access fibers has opened up the wavelength spacing in the access domain, reducing the demands on the precision of the outside plant/access equipment filters, the actual wavelengths used are directly photonically connected between the DWDM core and the semi-DWDM access. This means that the actual wavelengths have to be controlled to a precision compatible with the DWDM filters on the trunk side of the switch if they are to propagate successfully over that DWM core network. The downstream wavelengths into the access have been generated to the required precision. However, in the upstream direction, the need to concatenate the flow of the upstream wavelength through the 500 GHz spaced semi-DWDM access plant with its flow into the 100 GHz spaced core plant could be a problem. The metropolitan photonic node overcomes the problem by placing a multi-lambda wavelength generator in the central office as a centralized resource and by distributing out to the end access multiplexer/photonic end-point the lambda that it is to use. Furthermore such an approach actually simplifies wavelength administration because it removes the need to provision a tunable source in the remote access equipment.

Figure 13:
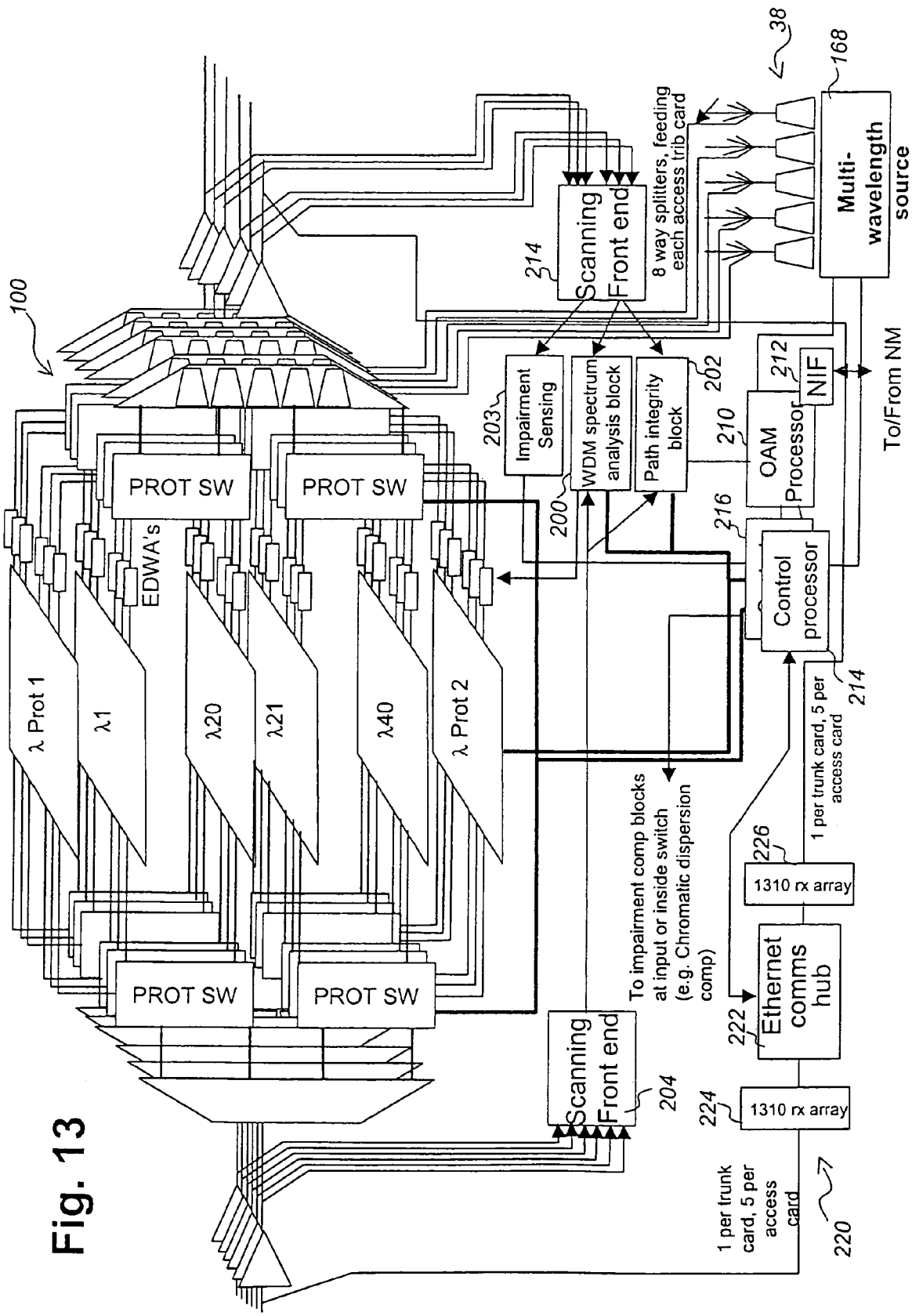
FIG. 13 Unidirectional trunk-to-access edge node
Figure 14:
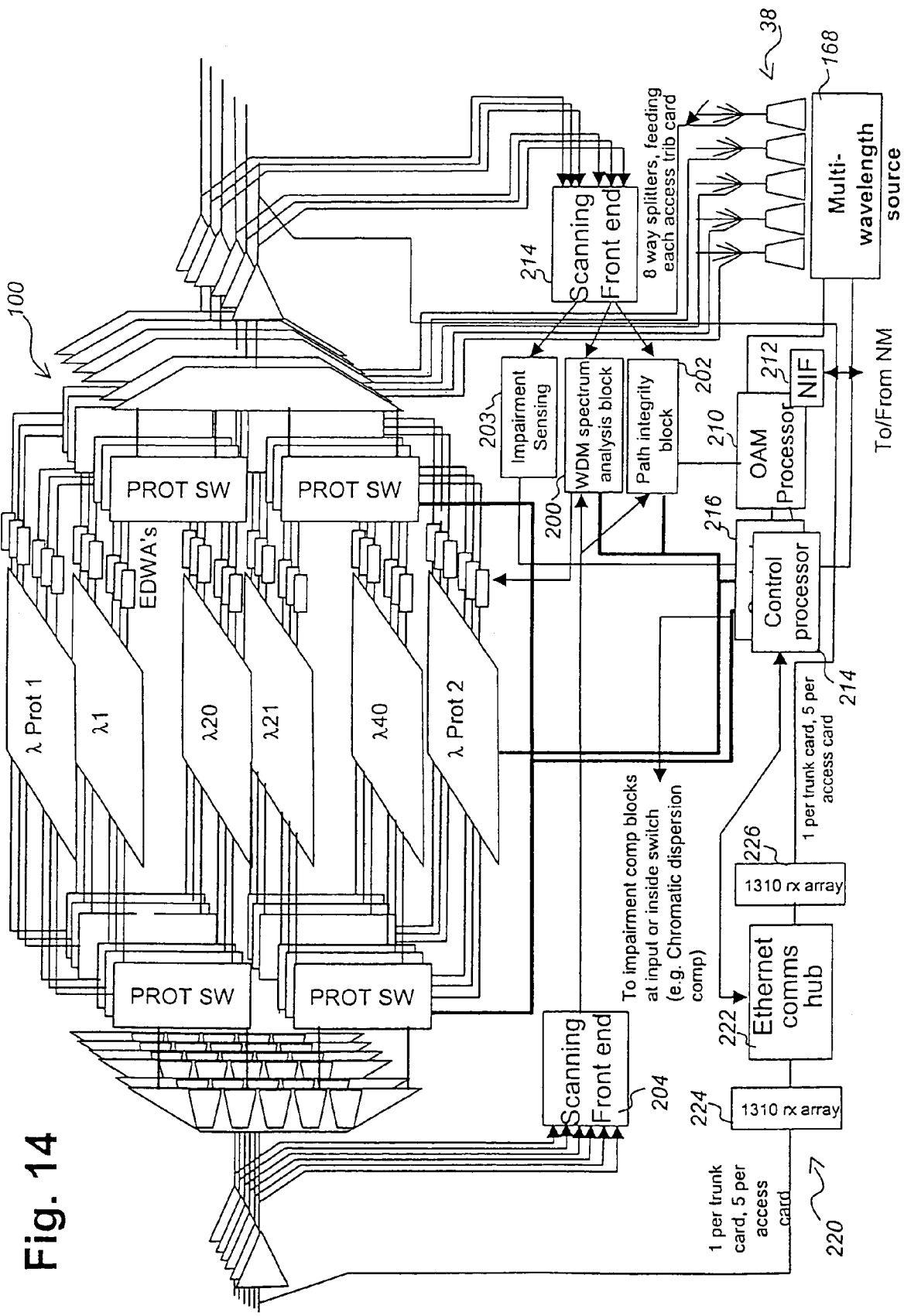
FIG. 14 Unidirectional Access-to-trunk edge node
Figure 15:
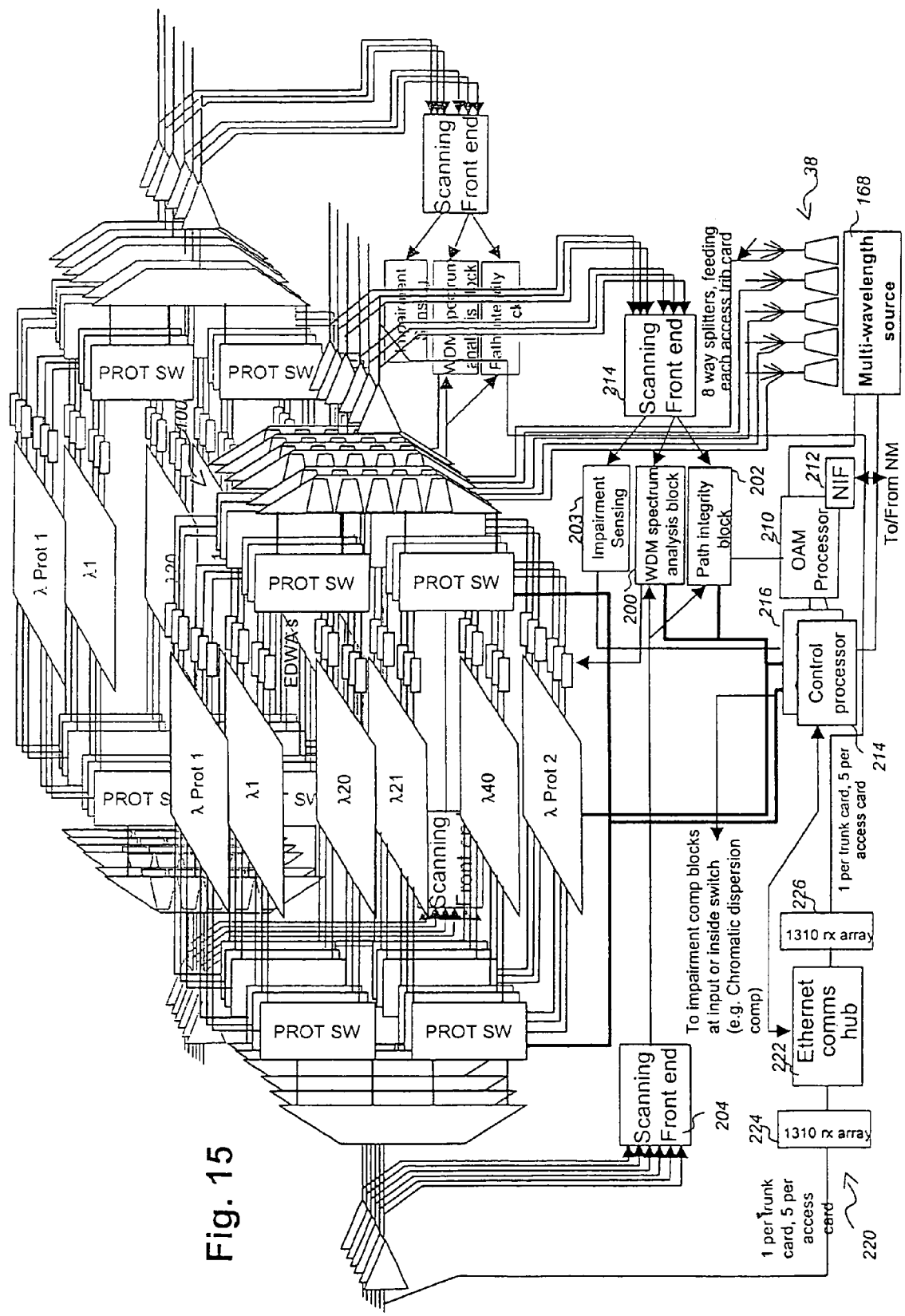
FIG. 15 Bidirectional edge node fabricated from two unidirectional edge node components FIG. 16 Addition of inter-directional unidirectional trunking to introduce a limited tandem node functionality FIG. 17 Switch plane implementation for the switch of FIG. 16, in 6 port MEMS.
Figure 16:
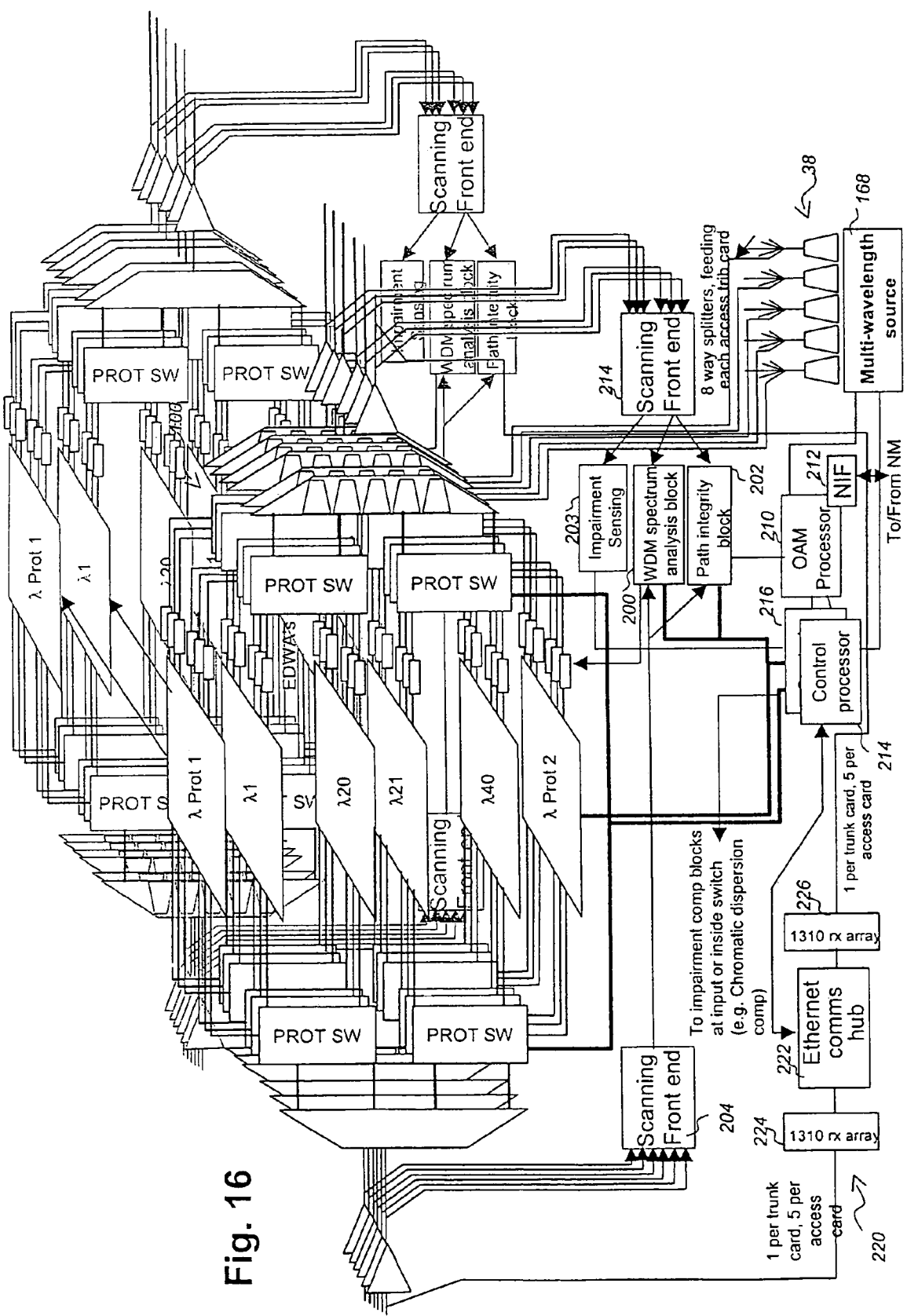
Figure 17:
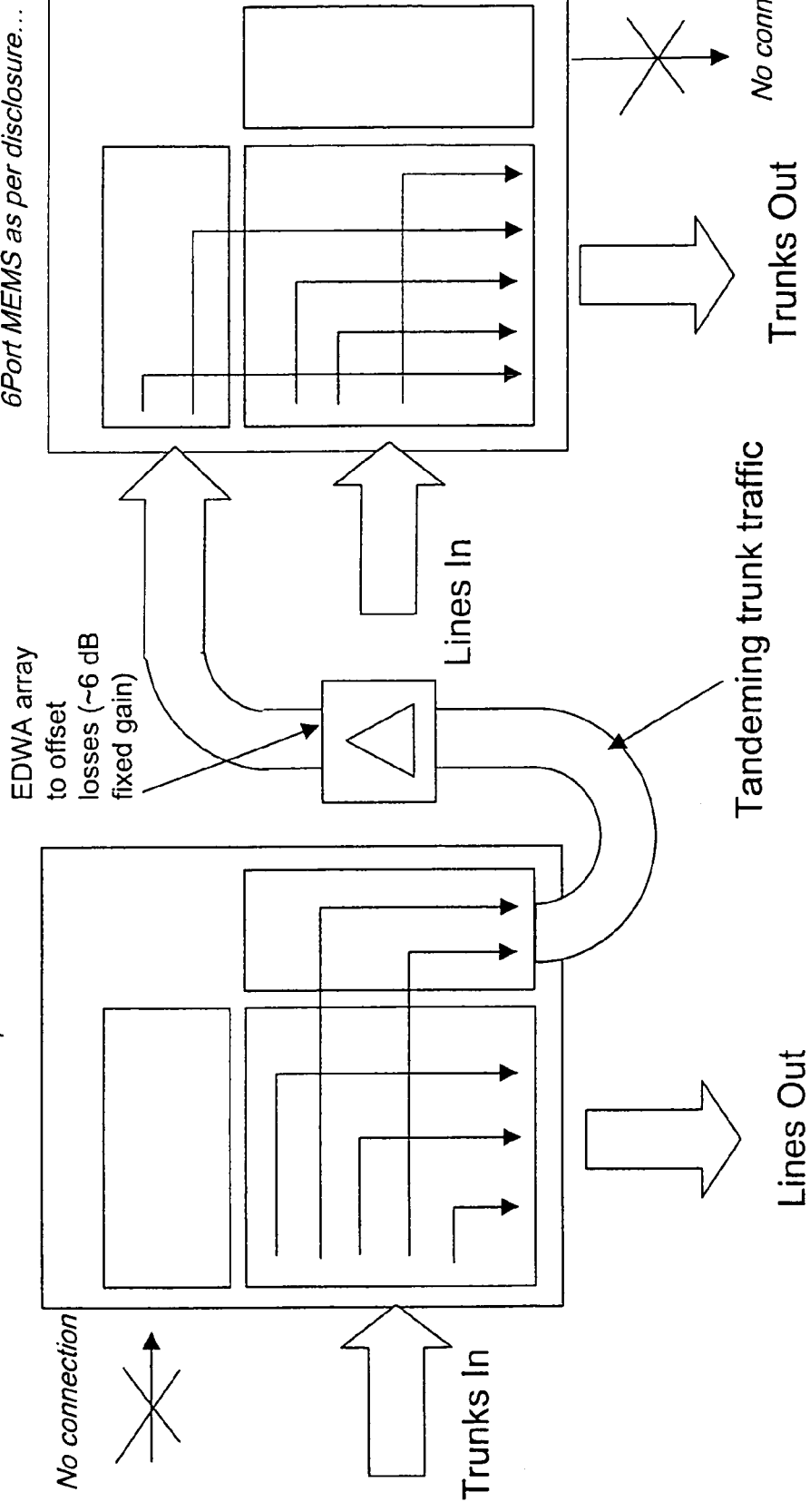

FIG. 12 shows a bi-directional switch node with a common switching fabric for the two directions. While this is the most generic structure, in the early period of photonic technology, when it is difficult to fabricate large switch modules, this can be limiting, since it reduces the capacity of the node 2:1 relative to what could be achieved if all of the switch module capacity could be devoted to a single direction of transmission, without changing the size of the module. We can exploit the architecture of FIG. 1 in that there is (in a pure edge photonic switch only) no access-to-access hair-pinning connectivity requirement and no trunk-to-trunk capability requirements, so the two directions can be separated at the fabric level (but not at the control level). FIG. 13 shows a uni-directional trunk-to-access switch, while FIG. 14 shows it's inverse. In fact both of these have to be combined under a common control structure to create a practical bi-directional access ←→trunk switch, which uses twice the number of the same size switch modules to produce a switch with twice the throughput (whereas the similar scaling of the switch of FIG. 11 would use the same number of switch modules, each of twice the size, which are more difficult to fabricate). FIG. 15 shows the two switches, one from FIG. 13 and one from FIG. 14, combined to create a single larger bi-directional edge switch. FIG. 16 shows how to modify this "pure" edge switch with only access ←→trunk connectivity into a switch that is predominantly an edge switch, but with an engineerable level of trunk ←→trunk connectivity. FIG. 17 shows how the inter-plane connectivity implied in FIG. 16 can be implemented using a subset of the capabilities of a 6-port MEMS device, such as was filed under co-pending application Ser. No. 09/593, 697 filed Jun. 15, 2000 and assigned to the same assignee as the present application. FIG. 15, 16 show the construction of a node of twice the throughput, in edge-only (FIG. 15) and edge-tandem mode (FIG. 16).

Figure 18:
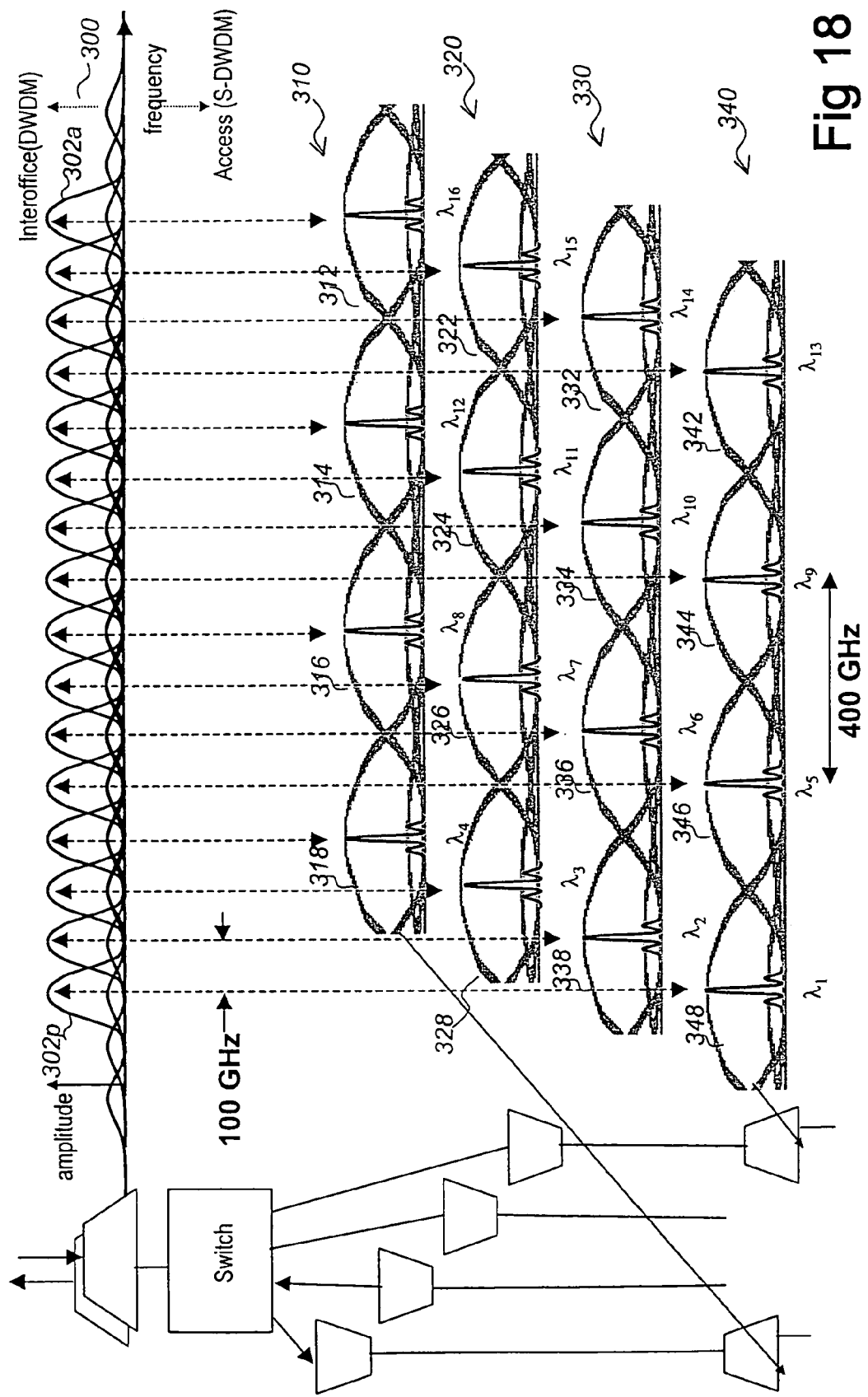
FIG. 18 graphically illustrates a second wavelength plan for the network of FIGS. 1–3.

Referring to FIG. 18, there is graphically illustrated a second wavelength plan for the network of FIG. 1. The second wavelength plan includes a simplified DWDM plan having 16 wavelengths and a simplified sparse DWDM plan having four wavelength groups of four wavelengths each. The DWDM wavelength plan 300 includes 16 wavelengths with representative response curves for the DWDM filter having peeks 302a through 302p. Corresponding sparse DWDM plan for the access network includes a first wavelength group 310 having coarse wavelengths division multiplex response curves 312,314,316 and 318. Similarly, wavelengths group 310 shows curves 312, 314, 316, 318, wavelengths group 320 shows response curves 322, 324, 326, 328 wavelength group 330 shows response curves 332, 334, 336, 338 and wavelengths group 340 shows curves 342, 344, 346, 348. The DWDM plan includes wavelengths having a spacing of 100 GHz while the sparse WDM access plan has a 400 GHz spacing between wavelengths. The characteristics of the wavelengths used are the same in both the DWDM plan and the sparse DWDM plan so that the wavelengths can pass from the access side of the network to the core side of the network without having to be regenerated. Similarly wavelengths passing from the DWDM core can move into the access portion without modification.

Figure 19:
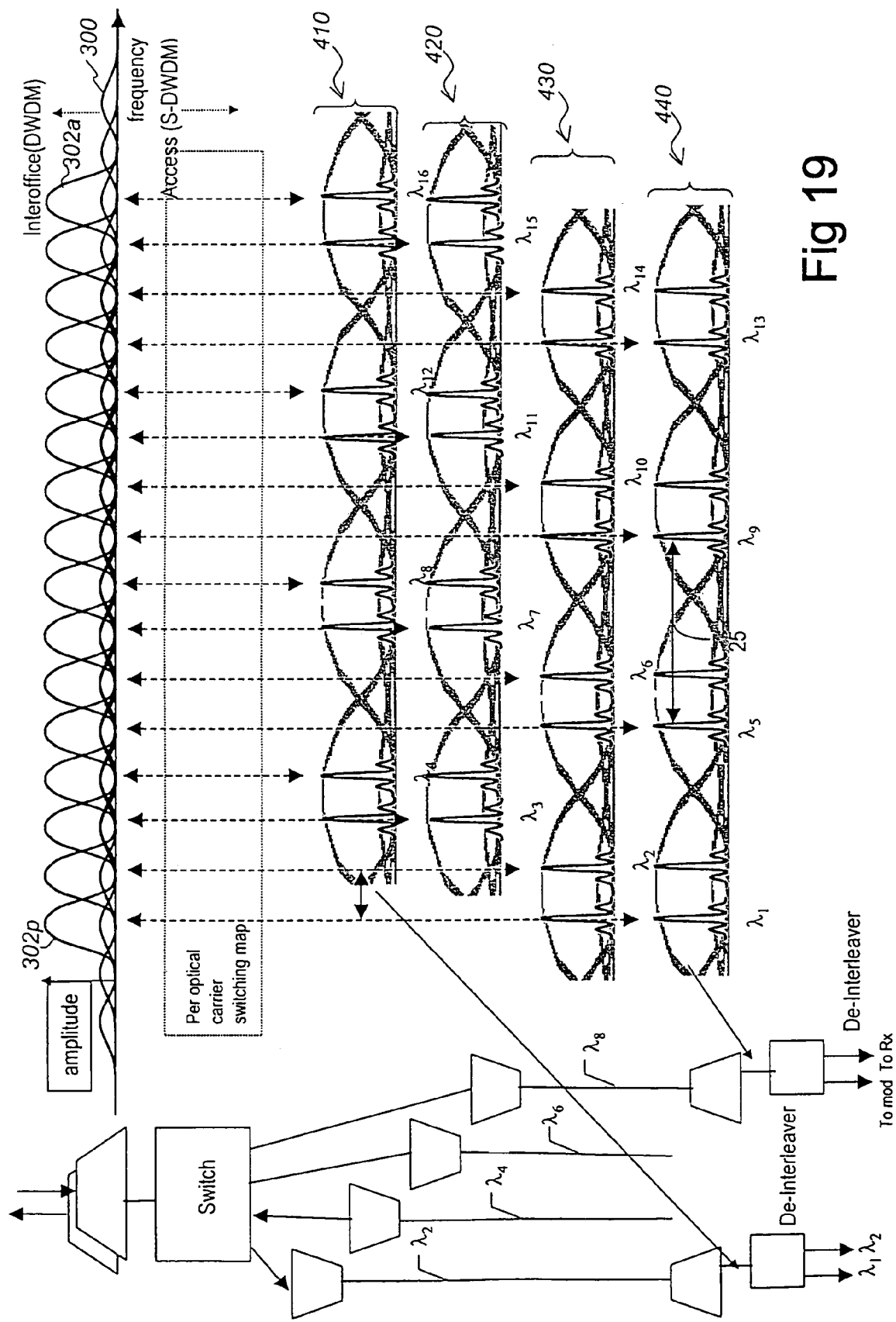
FIG. 19 Mapping of downstream data and unmodulated optical carrier to generate upstream data into a single S-DWDM filter passband lobe.

FIG. 19 shows one method of combining and delivering the optical carrier from the Multi-Lambda Source and the downstream traffic optical carrier from the far side of the network into a dual carrier group which can be passed through a common lobe of a field-mounted S-DWDM demultiplexer, thereby eliminating any lambda co-ordination issues associated with dual carrier transmission through the S-DWDM part.

Numerous modifications, variations and adaptations may be made to the particular embodiments of the invention described above without departing from the scope of the claims, which is defined in the claims.

What is claimed is:

1. An optical switching node for a photonic network comprising:
    a photonic switch core having a plurality of inputs and a plurality of outputs and capable of connecting any input to any output;
    a first wavelength division demultiplexer coupled to a subset of the plurality of inputs for demultiplexing an optical signal having a first multiplex density having a first wavelength spacing into optical channels;
    a first wavelength division multiplexer coupled to a subset of the plurality of outputs for multiplexing any optical channels connected to it into an optical signal having a second multiplex density having a second wavelength spacing;
    a multi-wavelength source for generating DWDM quality wavelengths for supplying access multiplexers with unmodulated wavelengths upon which to multiplex data packets,
    the second multiplex density being higher than the first; and
    the photonic switch core being operable to consolidate wavelengths from access multiplexers into a dense wavelength division multiplexed (DWDM) signal for transmission in a core network.

2. An optical switching node as claimed in claim 1 wherein the photonic switch core is capable of switching at the wavelength, group of wavelength, and fiber level.

3. An optical switching node as claimed in claim 1 further comprising a core node, coupled to the photonic switch core via a plurality of fiber optic cable for carrying a similar plurality of wavelengths from a DWDM signal, and operable to route the data packets modulated on the wavelengths within a communications network or out to a long haul network.

4. An optical switching node as claimed in claim 3 wherein the core node is capable of switching at the wavelength, group of wavelength, and fiber level.

5. An optical switching node as claimed in claim 3 wherein the core node includes a wavelength converter for converting one wavelength to another wavelength to provide an end-to-end photonic connection across the network.

6. An optical switching node as claimed in claim 5 wherein the wavelength converter includes opto-electronic devices.

7. A network as claimed in claim 6 wherein the wavelength converter includes photonic devices.

8. An optical switching node as claimed in claim 7 wherein the core node includes a packet router and a photonic switch coupled together to effect packet level switching for packets originating at access multiplexers.

9. An optical switching node as claimed in claim 8 wherein the core node includes a wavelength converter coupled to the photonic switch to effect an all photonic connection through the network.

10. An optical switching node as claimed in claim 9 wherein the photonic switch core includes a first plurality of input ports and a second plurality of output ports, with the first being greater than the second, whereby the photonic switch effects concentration of the wavelengths from the access multiplexers.

11. An optical switching node as claimed in claim 1 wherein the multi-wavelength source is a master optical carrier for the photonic network.

12. A photonic network comprising:
    an access node having an access multiplexer;
    an optical switching node for a photonic network comprising:
        a photonic switch core having a plurality of inputs and a plurality of outputs and capable of connecting any input to any output;
        a first wavelength division demultiplexer coupled to a subset of the plurality of inputs ford demultiplexing an optical signal having a first multiplex density having a first wavelength spacing into optical channels;
        a first wavelength division multiplexer coupled to a subset of the plurality of outputs for multiplexing any optical channels connected to it into an optical signal having a second multiplex density having a second wavelength spacing;
        a multi-wavelength source for generating DWDM quality wavelengths;
        the second multiplex density being higher than the first; and
        the photonic switch core being operable to consolidate wavelengths from access multiplexers into a dense wavelength division multiplexed (DWDM) signal for transmission in a core network.

13. The photonic network as claimed in claim 12, wherein the multi-wavelength source supplies the access node with unmodulated wavelengths for multiplexing wavelength at the access node.

14. The photonic network as claimed in claim 12, wherein the access node further comprises a multi-wavelength source.

15. The photonic network as claimed in claim 14, wherein the multi-wavelength of the access node is modulated at the access node.

16. The photonic network as claimed in claim 14, wherein the multi-wavelength source of the access node is a master optical carrier for the photonic network.

17. The photonic network as claimed in claim 12, wherein the access node further comprises an edge photonic switch.

18. The photonic network as claimed in claim 12, wherein the multi-wavelength source is a master optical carrier for the photonic network.

19. The photonic-network as claimed in claim 18, wherein the access node is synchronized to the master optical carrier.

* * * * *

UNITED STATES PATENT AND TRADEMARK OFFICE
CERTIFICATE OF CORRECTION

PATENT NO. : 7,050,667 B2 Page 1 of 1
APPLICATION NO. : 10/768050
DATED : May 23, 2006
INVENTOR(S) : Graves et al.

It is certified that error appears in the above-identified patent and that said Letters Patent is hereby corrected as shown below:

Column 5
line 24, delete "VWDM" and insert --WDM--.

Column 12
line 15, delete "T=100*S*UNV" and insert --T=100*S*U/V--.

Column 18
line 50, delete "ford" and insert --for--.

Column 19
line 10, after "multi-wavelength" insert --source--.

Signed and Sealed this

Ninth Day of January, 2007

JON W. DUDAS
*Director of the United States Patent and Trademark Office*